United States Patent
Makino

(10) Patent No.: US 10,288,885 B2
(45) Date of Patent: May 14, 2019

(54) HEAD-MOUNTED DISPLAY DEVICE INCLUDING PLURALITY OF DISPLAYS AND PLURALITY OF EYE LENSES

(71) Applicant: Panasonic Intellectual Property Management Co., Ltd., Osaka (JP)

(72) Inventor: Hiroyasu Makino, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/621,275

(22) Filed: Jun. 13, 2017

(65) Prior Publication Data

US 2017/0371162 A1    Dec. 28, 2017

(30) Foreign Application Priority Data

Jun. 28, 2016   (JP) .................. 2016-127974

(51) Int. Cl.
| | |
|---|---|
| G02B 27/01 | (2006.01) |
| F21V 8/00 | (2006.01) |
| G09G 3/34 | (2006.01) |
| G02B 27/00 | (2006.01) |
| G02B 7/28 | (2006.01) |

(52) U.S. Cl.
CPC ......... *G02B 27/0172* (2013.01); *G02B 6/003* (2013.01); *G02B 7/28* (2013.01); *G02B 27/0093* (2013.01); *G02B 27/0176* (2013.01); *G09G 3/3406* (2013.01)

(58) Field of Classification Search
CPC ............ G02B 27/0172; G02B 27/0093; G02B 27/0176; G02B 27/283; G02B 2027/0132; G02B 2027/0134; G02B 2027/0178; G02B 6/003; G02B 7/28; G09G 3/3406
See application file for complete search history.

(56) References Cited

U.S. PATENT DOCUMENTS

| | | | |
|---|---|---|---|
| 9,632,315 B2* | 4/2017 | Smith ................... | G02B 3/08 |
| 2002/0181115 A1* | 12/2002 | Massof ................ | G02B 27/017 |
| | | | 359/630 |

(Continued)

FOREIGN PATENT DOCUMENTS

| | | |
|---|---|---|
| JP | 7-072420 | 3/1995 |
| JP | 9-061750 | 3/1997 |

(Continued)

*Primary Examiner* — Tom V Sheng
(74) *Attorney, Agent, or Firm* — McDermott Will & Emery LLP

(57) ABSTRACT

A head-mounted display device includes: a first display that displays a first image, the first display being located in front of a pupil of a user in a forward-looking-state in which the pupil is looking forward; a second display that displays a second image, the second display being located diagonally in front of the pupil in the forward-looking-state; a first eye lens that causes first light of the first image to pass through the pupil, the first eye lens being located between the pupil and the first display in the forward-looking-state; and a second eye lens that causes second light of the second image to pass through the pupil, the second eye lens being located between the pupil and the second display in the forward-looking-state. The distance between the second display and the second eye lens decreases as a distance from the first display increases.

19 Claims, 19 Drawing Sheets

(56) References Cited

U.S. PATENT DOCUMENTS

| | | | |
|---|---|---|---|
| 2008/0158686 A1* | 7/2008 | Chechelniker | G02B 27/017 359/631 |
| 2013/0050832 A1* | 2/2013 | Tohara | G02B 27/0172 359/629 |
| 2016/0240013 A1* | 8/2016 | Spitzer | G06F 3/013 |
| 2016/0377869 A1* | 12/2016 | Lee | G02B 27/0172 359/631 |
| 2017/0115489 A1* | 4/2017 | Hu | G02B 27/0172 |
| 2017/0123209 A1* | 5/2017 | Spitzer | G02F 1/133504 |
| 2017/0184854 A1* | 6/2017 | Takagi | G02B 6/10 |
| 2017/0261752 A1* | 9/2017 | Koshihara | G02B 5/20 |

FOREIGN PATENT DOCUMENTS

| | | |
|---|---|---|
| JP | 2001-042250 | 2/2001 |
| JP | 2011-145488 | 7/2011 |
| JP | 2015-172616 | 10/2015 |

\* cited by examiner

LEFTWARD (TOWARD EAR) ⟵⟶ RIGHTWARD (TOWARD NOSE)

LEFTWARD (TOWARD EAR) ⟵⟶ RIGHTWARD (TOWARD NOSE)

HEAD-MOUNTED DISPLAY DEVICE INCLUDING PLURALITY OF DISPLAYS AND PLURALITY OF EYE LENSES

BACKGROUND

1. Technical Field

The present disclosure relates to a head-mounted display device.

2. Description of the Related Art

In recent years, display devices that display images have increased in size to allow viewers to experience a more stereoscopic effect and a more realistic effect.

In order to give a viewer wide-field effects such as a stereoscopic effect and a realistic effect, a display device needs to include a display screen all over an area of a horizontal angle of 100 degrees (50 degrees both leftward and rightward) in the viewer's field of vision (the wide-field effects become saturated at around 100 degrees). In this case, however, the display device needs to include a 200-inch or larger display screen placed two meters forward of the viewer.

Instead of such a large-sized stationary display device, a head-mounted display device that is worn on a viewer's head for use has been known as described in Japanese Unexamined Patent Application Publication No. 7-72420.

The head-mounted display device described in Japanese Unexamined Patent Application Publication No. 7-72420 includes: a display (liquid crystal display panel) that is placed in front of the pupil of a viewer's eyeball when worn on the viewer's head; and an eye lens, placed between the liquid crystal panel and the viewer's eyeball, which causes an image displayed on the liquid crystal display panel to be projected with magnification onto the pupil.

SUMMARY

In one general aspect, the techniques disclosed here feature a head-mounted display device that is worn on a user's head for use. The head-mounted display device includes: a first display that displays a first image, the first display being located in front of a pupil of the user in a state in which the pupil is looking forward of the user; a second display that displays a second image, the second display being located diagonally in front of the pupil in the state; a first eye lens that causes first light of the first image to pass through the pupil, the first eye lens being located between the pupil and the first display in the state; and a second eye lens that causes second light of the second image to pass through the pupil, the second eye lens being located between the pupil and the second display in the state. The distance between the second display and the second eye lens decreases as a distance from the first display increases.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
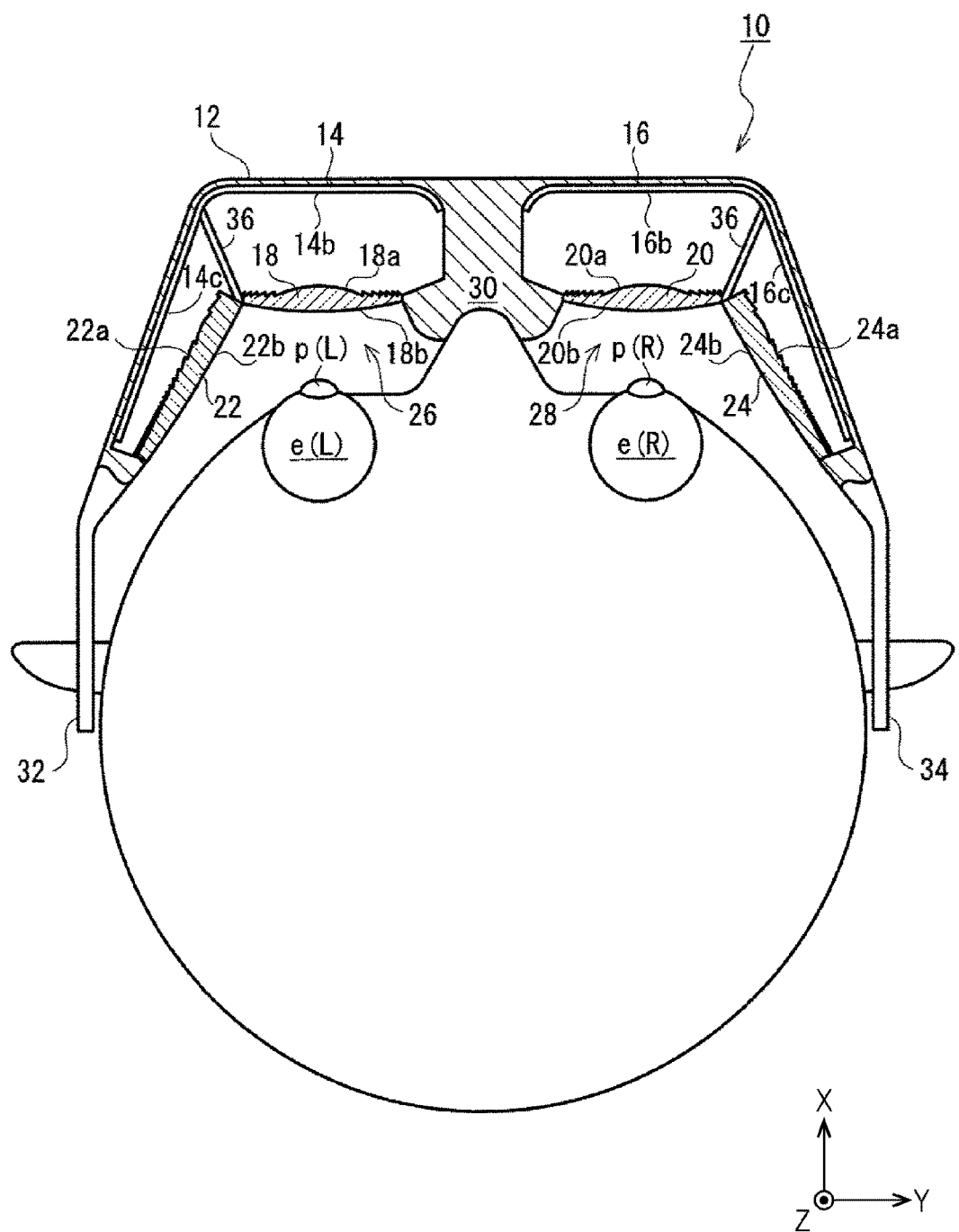
FIG. 1 is a schematic configuration diagram of a head-mounted display device according to a first embodiment, with the head-mounted display device worn on a viewer's head.

In recent years, a head-mounted display device has been required to give a further more realistic effect. However, increasing the size of the display (e.g. the liquid crystal display panel) or the eye lens for this purpose leads to increases in size and weight of the head-mounted display device. This results in a deterioration in the usability of the head-mounted display device. The present disclosure provides a head-mounted display device that gives a further realistic effect with less increases in size and weight.

A head-mounted display device according to an aspect of the present disclosure is a head-mounted display device that is worn on a viewer's head for use, including: a first display that displays a first image, the first display facing a pupil with which the viewer looks forward, the first display being located in a position in front of the pupil; a second display that displays a second image, the second display facing the pupil with which the viewer looks forward, the second display being located in a position diagonally in front of the pupil; a first eye lens that projects the first image onto the pupil, the first eye lens being located in a position between the pupil and the first display; and a second eye lens that projects the second image onto the pupil, the second eye lens located in a position between the pupil and the second display, wherein the second display is positioned with respect to the second eye lens so that at least part of the second display is located closer to the second eye lens than a position at which the second image is formed on the retina of the viewer's eyeball.

Such a configuration makes it possible to provide a head-mounted display device that gives a further realistic effect with less increases in size and weight.

For example, the second display is placed so that a part of the second display that is farther from the first display comes closer to the second eye lens than a part of the second display that is closer to the first display. Bringing closer to the second eye lens the part of the second display located near the boundary of the field of vision, which is low in information discrimination capabilities, allows the head-mounted display device to be smaller in size and lighter in weight.

For example, the angle of view of the first eye lens falls within a range of 60 degrees to 120 degrees. This causes only the first eye lens to be placed in the central area of the field of vision, which is high in information discrimination capabilities. This allows the viewer, as a result, to view an image clearly through only the first eye lens.

For example, a lens surface of the first eye lens that faces the first display at least partly includes a Fresnel lens section. This allows the first eye lens to be thinner, i.e. smaller in size and lighter in weight. This allows the head-worm display device, as a result, to be smaller in size and lighter in weight.

For example, the lens surface of the first eye lens that faces the first display includes a convex lens section placed in the center of the lens surface and a Fresnel lens section placed around the convex lens section. Placing the Fresnel lens section in the center of the field of vision, which is high in information discrimination capabilities, may cause the viewer to notice annular stripes of the Fresnel lens section. Placing the convex lens section in the center of the field of vision and placing the Fresnel lens section around the convex lens section makes the annular stripes of the Fresnel lens section less conspicuous to the viewer.

For example, a lens surface of the second eye lens that faces the second display at least partly includes a Fresnel lens section. This allows the second eye lens to be thinner, i.e. smaller in size and lighter in weight. This allows the head-worm display device, as a result, to be smaller in size and lighter in weight.

For example, in a cross-sectional view of the second eye lens, the Fresnel lens section of the second eye lens has rising surfaces tilted with respect to the optical axis of the second eye lens so that a rising surface of the Fresnel lens section of the second eye lens that faces the first eye lens does not face the pupil of the viewer in a forward-viewing state. With this, annular stripes of the Fresnel lens section that are closer to the first eye lens, i.e. closer to the central field of vision, which is high in information discrimination capabilities, become less conspicuous to the viewer.

For example, the Fresnel lens section of the second eye lens has a plurality of V-shaped grooves, and those of the V-shaped grooves which are farther from the first eye lens are greater in depth than those of the V-shaped grooves which are closer to the first eye lens. With this, the time required to fabricate the second eye lens is shortened by increasing the depths of those of the V-shaped grooves which are farther from the first eye lens, i.e. located near the boundary of the field of vision, which is low in information discrimination capabilities (i.e. by reducing the total number of V-shaped grooves). This makes it possible, as a result, to lower the manufacturing cost of the second eye lens.

For example, the first eye lens and the second eye lens are placed so that a viewer-side lens surface of the first eye lens and a viewer-side lens surface of the second eye lens are horizontally continuous in the whole or central part of the viewer's vertical field of vision as seen from the viewer. With this, even if the line of sight shifts upward or downward, the viewer can view the first image, transmitted through the first eye lens, and the second image, transmitted through the second eye lens, in a horizontally continuous state.

For example, the first eye lens and the second eye lens include cut sections formed by partly cutting the first eye lens and the second eye lens, and in the cut sections, the first eye lens and the second eye lens come into contact with each other so that the respective viewer-side lens surfaces of the first and second eye lenses are horizontally continuous in the whole or central part of the viewer's vertical field of vision as seen from the viewer. This allows the viewer to view the first image, transmitted through the first eye lens, and the second image, transmitted through the second eye lens, in a horizontally continuous state.

For example, the first eye lens includes an upper cut section, a lower cut section, a second eye lens side cut section formed by cutting off an upper part of the first eye lens, a lower part of the first eye lens, and a part of the first eye lens that is on one side of the second eye lens, respectively, and the second eye lens includes an upper cut section, a lower cut section, a first eye lens side cut section formed by cutting off an upper part of the second eye lens, a lower part of the second eye lens, and a part of the second eye lens that is on one side of the first eye lens, respectively. Moreover, the second eye lens side cut section of the first eye lens comes into contact with the first eye lens side cut section of the second eye lens.

The second eye lens is partly cut, for example, into the shape of the letter "D" when seen from an angle along the optical axis of the second eye lens. This allows the second eye lens to be made compact in size and yet have a wide horizontal angle of view.

A light propagation space between the first display and the first eye lens and a light propagation space between the second display and the second eye lens are separated from each other. This prevents part of light having exited from the first display from entering the second eye lens and prevents part of light having exited from the second display from entering the first eye lens. This allows the viewer, as a result, to view the first image in good condition through the first eye lens and view the second image in good condition through the second eye lens.

For example, the first display and the second display constitute one common curved display, and the first image and the second image are displayed in different positions on the curved display. With this, the control of the display is more simplified (for example, only one control circuit is needed for the display) than in a case where the first display and the second display are separate displays.

For example, the curved display may be a flexible display.

For example, the head-mounted display device includes: an original image acquirer that acquires an original image; a display image extractor that extracts, from the original image, first and second images that have common parts; and an image size corrector that corrects the sizes of the first and second images so that the second image becomes smaller than the first image. This allows the viewer to view the first image and the second image in a continuous state without a feeling of strangeness.

For example, the display image extractor extracts the first image and the second image from the original image so that the second image that the viewer views through the second eye lens is smaller in horizontal size than the first image that the viewer views through the first eye lens. This causes the boundary between the first image and the second image to be located outside of the center of the field of vision, which is high in information discrimination capabilities. This makes it harder for the boundary to be visually identified.

For example, the head-mounted display device includes an aberration corrector that corrects the first image and the second image on the basis of the aberration properties of the first and second eye lenses. This allows the viewer to view the first and second image in a continuous state without a feeling of strangeness.

For example, the head-mounted display device includes an image color tone adjuster that adjusts the color tones of the first and second images on the basis of the viewing angle characteristics of the first and second displays so that the first image and the second image are projected onto the retina of the eyeball in the same color tones. This allows the viewer to view the first and second image in a continuous state without a feeling of strangeness.

For example, the first eye lens and the second eye lens each include a film, a coating layer, or a filter that makes color tone adjustments determined on the basis of the viewing angle characteristics of the first and second displays so that the first image and the second image are projected onto the retina of the eyeball in the same color tones. This allows the viewer to view the first and second image in a continuous state without a feeling of strangeness.

Embodiments are described in detail below with appropriate reference to the drawings. Note, however, that an unnecessarily detailed description may be omitted. For example, a detailed description of an already well-known matter or a repeated description of substantially the same components may be omitted. This is intended to avoid an unnecessarily redundant description to facilitate understanding of persons skilled in the art.

It should be noted that the inventors of the present disclosure intend to provide the accompanying drawings and the following descriptions to facilitate full understanding of persons skilled in the art, but not to thereby limit the subject matters recited in the claims.

First Embodiment

FIG. 1 schematically shows a configuration of a head-mounted display device according to a first embodiment. The head-mounted display device shown in FIG. 1 is in a state of being appropriately worn on a viewer's head.

It should be noted that the drawing shows X-Y-Z coordinates consisting of X, Y, and Z axes that are orthogonal to one another. An X-axis direction is a front-back direction on a horizontal plane with respect to the viewer. A Y-axis direction is a transverse direction on the horizontal plane. A Z-axis direction is a vertical direction that is orthogonal to the horizontal plane. The X-Y-Z coordinates are intended not to limit the present disclosure but solely to simply help understand the present disclosure. Therefore, FIG. 1 shows the head-mounted display device with an overhead view of the viewer looking forward.

As shown in FIG. 1, a head-mounted display device 10 according to the first embodiment is worn on the viewer's head or, specifically, worn on the head in such a way as to cover the viewer's left and right eyeballs e(L) and e(R).

As shown in FIG. 1, the head-mounted display device 10 includes a body 12 that is worn on the viewer's head. The body 12 contains left-eye and right-eye displays 14 and 16, left-eye and right-eye first eye lenses 18 and 20, and left-eye and right-eye second eye lenses 22 and 24. Further, as will be described in detail later, the left-eye first eye lens 18 and the left-eye second eye lens 22 are combined to constitute a left-eye eye lens array 26, and the right-eye first eye lens 20 and the right-eye second eye lens 24 are combined to constitute a right-eye eye lens array 28.

It should be noted that the left-eye optical system and the right-eye optical system are substantially the same except that they are bilaterally symmetrical. That is, the displays 14 and 16 are substantially the same, and the first eye lenses 18 and 20 are substantially the same. Moreover, the second eye lenses 22 and 24 are substantially the same. For this reason, the following mainly describes the left-eye optical system and omits to describe the right-eye optical system.

Figure 2:
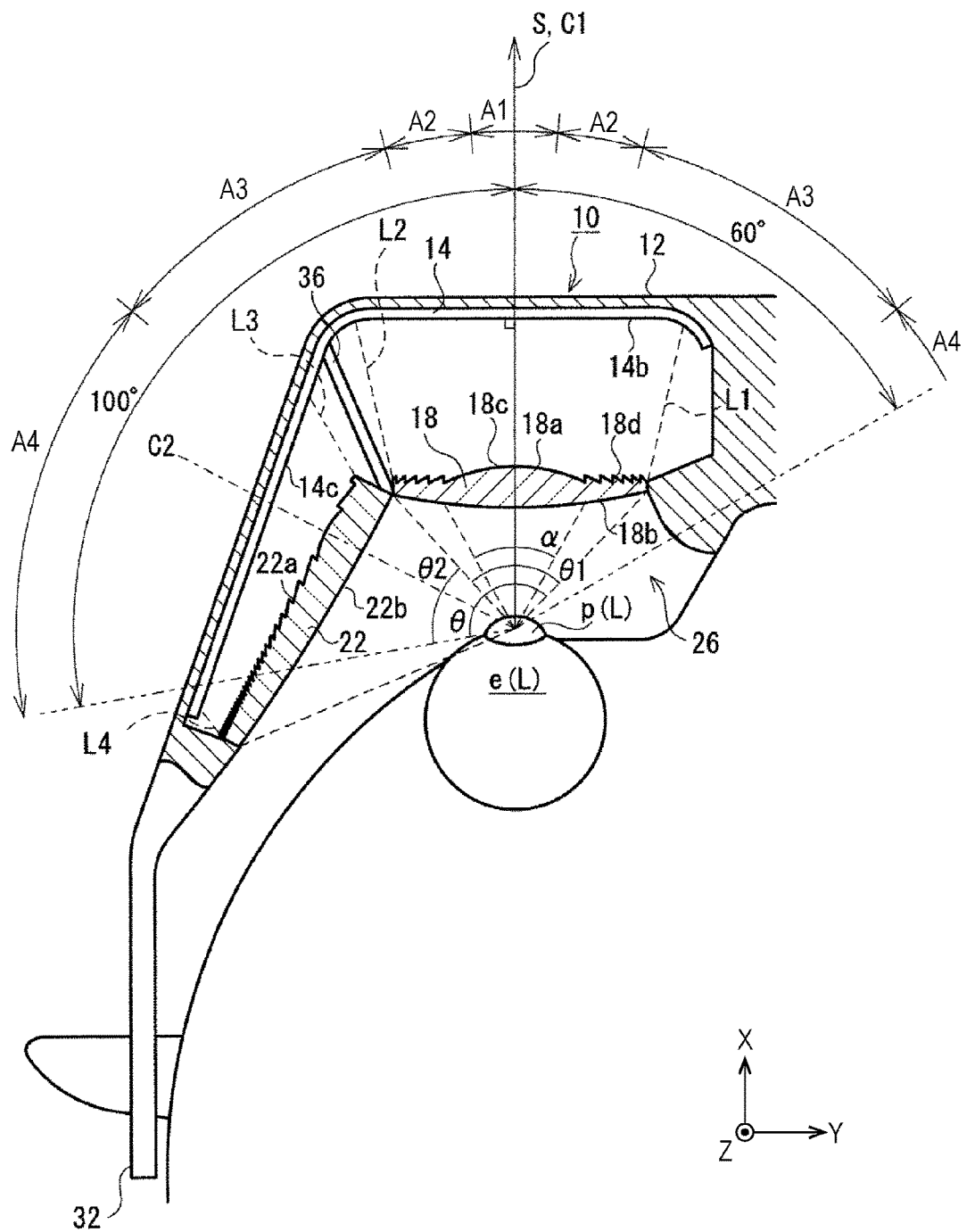
FIG. 2 is a diagram showing a left-eye optical system of the head-mounted display device in a state in which the viewer directs his/her line of sight forward.
Figure 3:
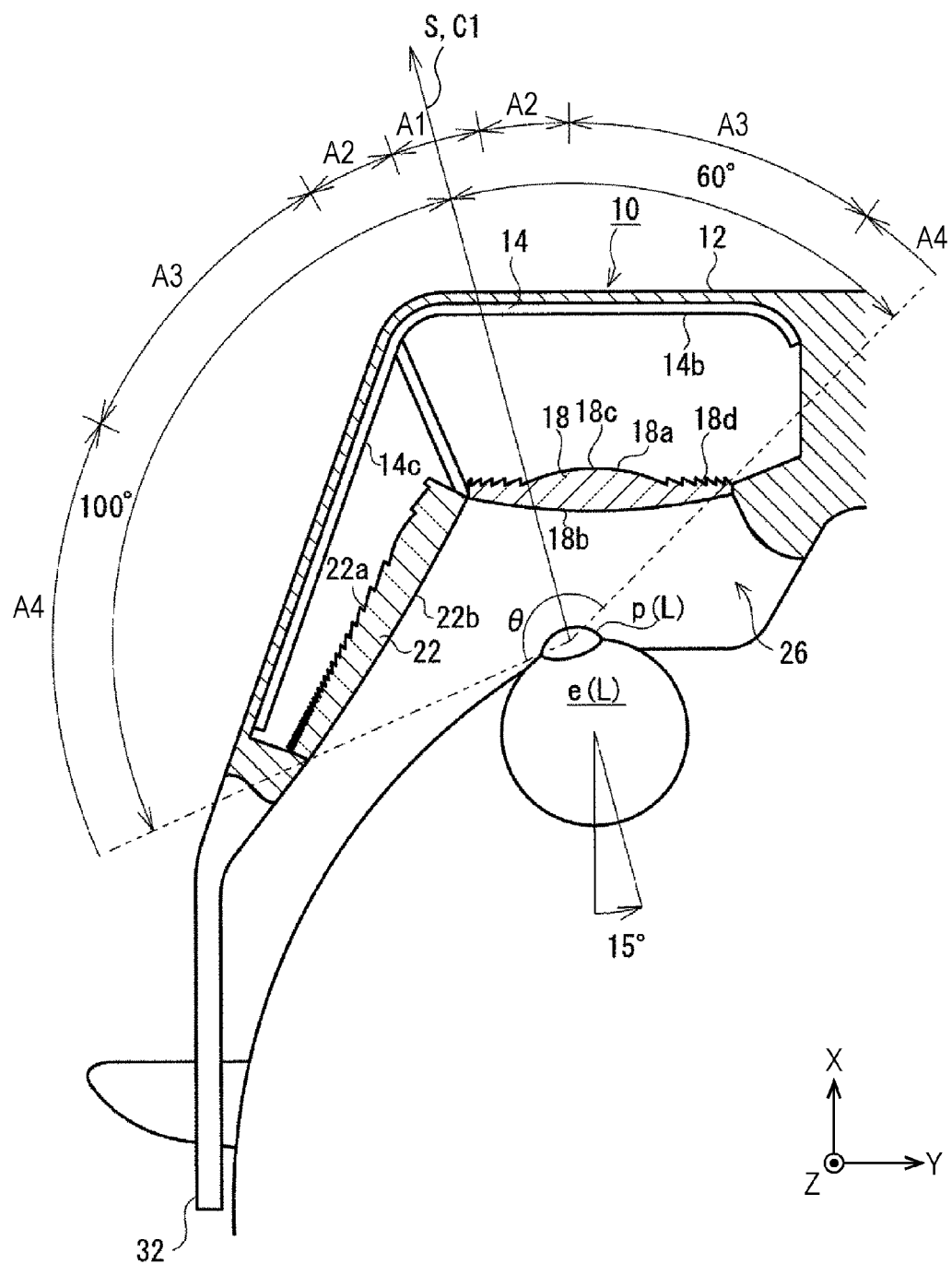
FIG. 3 is a diagram showing the left-eye optical system of the head-mounted display device in a state in which the viewer directs his/her line of sight diagonally forward.

FIGS. 2 and 3 show the left-eye optical system of the head-mounted display device 10. FIG. 2 shows a state in which the viewer is looking forward (i.e. in the X-axis direction), and FIG. 3 shows a state in which the viewer is looking laterally diagonally forward (i.e. in a horizontal direction tilted at approximately 15 degrees with respect to the X-axis direction).

As shown in FIG. 2, the display 14 and the left-eye eye lens 26 (i.e. the first and second eye lenses 18 and 22) are placed in front of the viewer's eyeball e(L).

It should be noted that, as just described, the position of each of the constituent elements of the head-mounted display device 10 is herein sometimes identified with reference to the position of the viewer's eyeball (or its pupil). In this case, the position of the constituent element is identified with reference to the position of the eyeball of the viewer appropriately wearing the head-mounted display device 10 on his/her head. Therefore, the head-mounted display device 10 is configured to be appropriately worn on the viewer's head, i.e. to be appropriately positioned with respect to the head. For example, as shown in FIG. 1, the head-mounted display device 10 includes a nose pad 30 that is fitted on the viewer's nose and ear pads 32 and 34 that rest over the viewer's ears.

Figure 4:
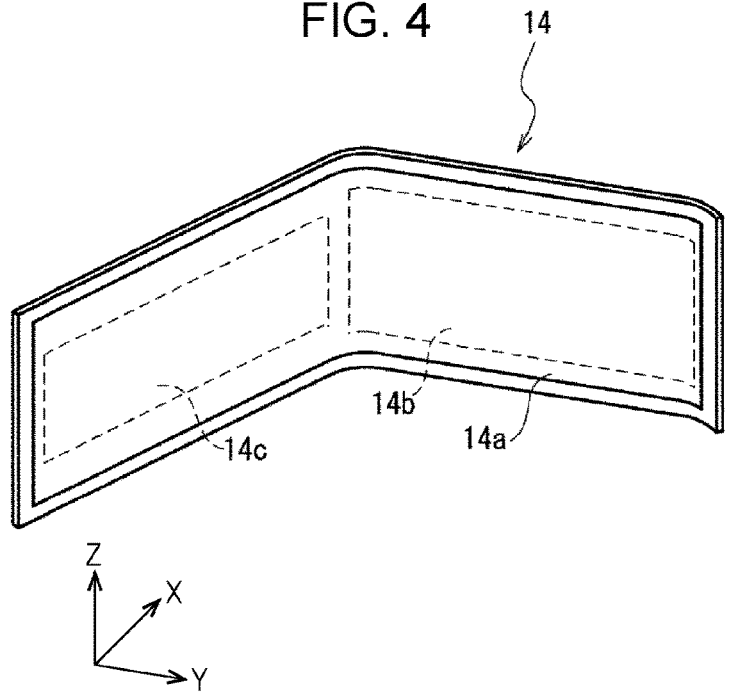
FIG. 4 is a schematic perspective view of a display.

In the case of the first embodiment, as shown in FIG. 4, the display 14 is a belt-shaped curved liquid crystal display bent in a horizontal direction (i.e. on a horizontal plane (X-Y plane)). The display 14 includes a display screen 14a on which an image is displayed. As will be described in detail later, the display screen 14a includes a first display area (first display) 14b that displays a first image that is projected onto the first eye lens 18 and a second display area (second display) 14c that displays a second image that is projected onto the second eye lens 22. This causes the first and second images to be displayed in different positions on the display screen 14a. It should be noted that the display 14 may alternatively be a flexible liquid crystal display. Alternatively, the display 14 may be an OLED (organic light-emitting diode) display instead of being a liquid crystal display.

As shown in FIG. 2, in a state of facing the pupil p(L) of the viewer's eyeball e(L) in a forward-viewing state, the first display area 14b of the display 14 is placed in front of the pupil p(L). In the case of the first embodiment, the display area 14b of the display screen 14a is placed to be substantially orthogonal to the line of sight S of the eyeball e(L) in a forward-viewing state.

Meanwhile, in a state of facing the pupil p(L) of the viewer's eyeball e(L) in a forward-viewing state, the second display area 14c of the display 14 is placed laterally diagonally in front of the pupil p(L) in a horizontal direction. In the case of the first embodiment, the second display area 14c is placed to be substantially orthogonal to a direction tilted outward (i.e. toward the ear) at a horizontal angle of approximately 70 degrees with respect to the line of sight S of the viewer's eyeball e(L) in a forward-viewing state.

As shown in FIG. 2, the first eye lens 18 of the left-eye eye lens array 26 is placed between the first display area 14b of the display 14 and the pupil p(L) of the viewer's eyeball e(L). This allows the first eye lens 18 to project the first image, displayed in the first display area 14b, with magnification onto the pupil p(L). In the case of the first embodiment, the first eye lens 18 is also placed so that its optical axis C1 substantially coincides with the line of sight S of the viewer's eyeball e(L) in a forward-viewing state. That is, the optical axis of C1 of the first eye lens 18 is substantially orthogonal to the first display area 14b of the display screen 14a. It should be noted that although the display 14 illustrated in FIG. 2 is partly flat, this is not always the case. The display 14 may alternatively be wholly curved (as will be described in detail later).

The term "optical axis" of a lens herein means an axis that coincides with a straight line connecting a focal point (back focal point) at which parallel rays of light having fallen orthogonally on a front lens surface (display-side lens surface) and passed through the lens meet on a back lens surface (viewer-side lens surface) with a focal point (front focal point) at which parallel rays of light having fallen orthogonally on the back lens surface and passed through the lens meet on the front lens surface.

Meanwhile, the second eye lens 22 of the left-eye eye lens array 26 is placed between the second display area 14c of the display 14 and the pupil p(L) of the viewer's eyeball e(L). This allows the second eye lens 22 to project the second image, displayed in the second display area 14c, with magnification onto the pupil p(L). In the case of the first embodiment, the second eye lens 22 is also placed so that its optical axis C2 is tilted outward, for example, at approximately 60 degrees with respect to the line of sight S of the viewer's eyeball e(L) in a forward-viewing state (i.e. with respect to the optical axis C1 of the first eye lens 18). That is, for a reason that will be stated below, the optical axis C2 of the second eye lens 22 is not orthogonal to the second display area 14c of the display screen 14a.

In the case of the first embodiment, the optical axes C1 and C2 of the left-eye first and second eye lenses 18 and 22 are located on substantially the same plane (X-Y plane) together with the optical axes of the right-eye first and second eye lenses 20 and 24.

Further, both ends of the first display area 14b of the display 14 are placed on sides opposite to the optical axis C1 of the first eye lens 18 with respect to optical paths L1 and L2 passing from the viewer's pupil p(L) through edges of the first eye lens 18. Both ends of the second display area 14c of the display 14 are placed on sides opposite to the optical axis C2 of the second eye lens 22 with respect to optical paths L3 and L4 passing from the viewer's pupil p(L) through edges of the second eye lens 22.

Furthermore, the end of the first display area 14b of the display 14 that is closer to the second display area 14c and the end of the second display area 14c of the display 14 that is closer to the first display area 14b are placed in an area between the optical path L2, which passes from the viewer's pupil p(L) through the edge of the first eye lens 18 that faces the second eye lens 22, and the optical path L3, which passes from the pupil p(L) through the edge of the second eye lens 22 that faces the first eye lens 18.

Such first and second eye lenses 18 and 22 of the left-eye eye lens array 26 cause the first and second images displayed in the first and second display areas 14b and 14c, respectively, of the display 14 to be projected in a horizontally continuous state (concatenated state) onto the retina of the eyeball e(L).

It should be noted that, as shown in FIG. 2, a space of propagation of light traveling from the first display area 14b of the display 14 toward the first eye lens 18 (a light propagation space between the first display area 14b and the first eye lens 18) and a space of propagation of light traveling from the second display area 14c toward the second eye lens 22 (a light propagation space between the second display area 14c and the second eye lens 22) are separated from each other. Specifically, the two spaces are separated from each other by a light shield 36. That is, the light shield 36 is placed in the area between the optical path L2, which passes from the viewer's pupil p(L) through the edge of the first eye lens 18 that faces the second eye lens 22, and the optical path L3, which passes from the pupil p(L) through the edge of the second eye lens 22 that faces the first eye lens 18. This for example prevents part of light having exited the first display area 14b from entering the second eye lens 22 and prevents part of light having exited the second display area 14c from entering the first eye lens 18. This allows the viewer, as a result, to view the first image in good condition through the first eye lens 18 and view the second image in good condition through the second eye lens 22.

The left-eye eye lens array 26 (i.e. the first and second eye lenses 18 and 22) is also designed and used on the basis of the visual characteristics of the viewer, i.e. a human. Therefore, the visual characteristics of a human are described as a preliminary preparation for a detailed description of the left-eye eye lens array 26.

Figure 5:
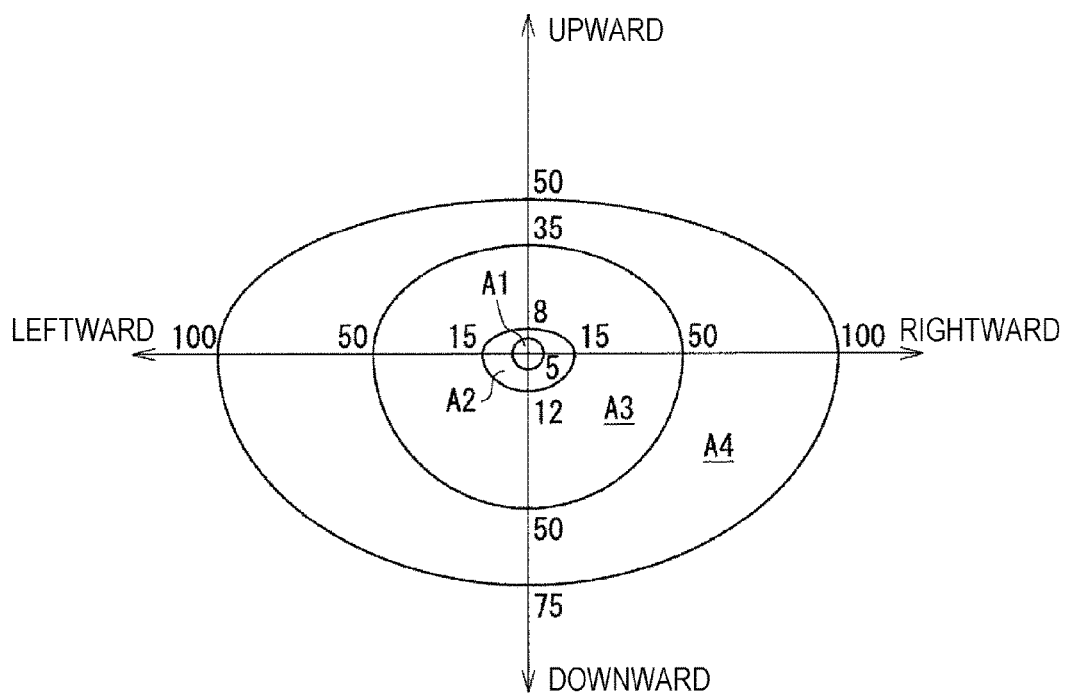
FIG. 5 is a diagram for explaining a human's field of vision.

FIG. 5 shows a human's binocular field of vision. As shown in FIG. 5, the human's binocular field of vision extends over an area of a horizontal angle of approximately 200 degrees (an area of up to 100 degrees both leftward and rightward) and an area of a vertical angle of approximately 125 degrees (an area of up to approximately 50 degrees upward and up to approximately 75 degrees downward). It should be noted that a target located near the boundary of the horizontal field of vision is visually identified not with two eyes but with only one eye. That is, the horizontal field of vision of one eye extends up to approximately 60 degrees toward the nose and up to approximately 100 degrees toward the ear (i.e. outward).

The binocular field of vision is broadly divided into four areas according to human information discrimination capabilities. In descending order of information discrimination capabilities, the field of vision is divided into a discriminative field of vision A1 located in the center of the field of vision, an effective field of vision A2 surrounding the discriminative field of vision A1, an inductive field of vision A3 surrounding the effective field of vision A2, and an auxiliary field of vision A4 surrounding the inductive field of vision A3.

The discriminative field of vision A1 located in the center of the field of vision is an area of up to approximately 5 degrees upward, downward, leftward, and rightward. This area is highest in information discrimination capabilities such as visual acuity and color discrimination.

The effective field of vision A2 surrounding the discriminative field of vision A1 is an area of up to approximately 15 degrees both leftward and rightward, up to approximately 8 degrees upward, and up to approximately 12 degrees downward. In this area, an instantaneously-presented target can be captured with only an eyeball movement (without a head movement).

The inductive field of vision A3 surrounding the effective field of vision A2 is an area of up to approximately 50 degrees both leftward and rightward, up to approximately 35 degrees upward, and up to approximately 50 degrees downward. In this area, only the presence of a presented target can be determined. This area affects a human sense of space coordinates, i.e. induces wide-field effects such as a stereoscopic effect and a realistic effect.

The outermost auxiliary field of vision A4 surrounding the inductive field of vision A3 is an area where there is an extreme decrease in perception of a presented target and the presence of a strong stimulus is recognized.

Figure 6:
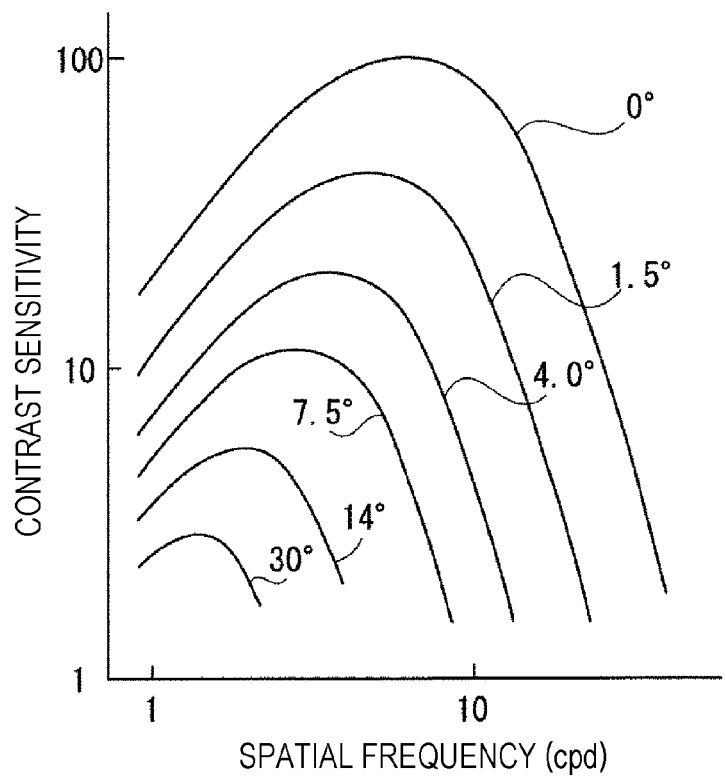
FIG. 6 is a diagram showing information discrimination capabilities involved in a human sense of vision.

Further, FIG. 6 is a diagram showing the resolution characteristics of a human eyeball in a plurality of horizontal positions (angular positions) toward the nose, respectively (JYRKI ROVAMO et al. "Cortical magnification factor predicts the photopic contrast sensitivity of peripheral vision," Nature 271, 54-56 (5 Jan. 1978)).

As shown in FIG. 6, even a striped pattern with a high spatial frequency and a low contrast can be visually identified in the center of a human field of vision (0 degree), but the maximum spatial frequency at which a visual identification can be made is reduced by a half at 1.5 degrees away from the center. Furthermore, the maximum spatial frequency is reduced to approximately one-twentieth at 30 degrees away from the center.

In view of the visual characteristics shown in FIGS. 5 and 6, it is found that, in comparison with the inside of the effective field of vision A2, which is an area of approximately 30 degrees (an area of up to approximately 15 degrees both leftward and rightward), the outside of the effective field of vision A2 is lower in resolution (maximum spatial frequency) of a visually-identifiable image. This shows that it is of low necessity that an image of a target located in an area of a field of vision of over approximately 30 degrees be ideally formed on the retina of the viewer's eyeball.

With consideration given to these visual characteristics, the left-eye eye lens array 26 (i.e. the first and second eye lenses 18 and 22) is configured in the following manner.

First, as shown in FIG. 2, the left-eye eye lens array 26 (i.e. the first and second eye lenses 18 and 22) is placed within a 160-degree field of vision of the eyeball e(L) alone in a forward-viewing state (an area of up to approximately 100 degrees outward and up to approximately 60 degrees toward the nose). Further, the left-eye eye lens array 26 has an angle of view θ of approximately 150 degrees on the eyeball e(L) in a forward-viewing state. More specifically, the first eye lens 18 has an angle of view θ1 of approximately 90 degrees, and the second eye lens 22 has an angle of view θ2 of approximately 60 degrees.

The term "angle of view" herein means an angle, determined by the distance (eye relief) between a lens and the pupil, at which the lens can form an image on the retina. Further, the phrase "form an image" herein means that an image that is similar in shape to an image displayed on a display is formed on the retina (i.e. that the viewer can view a clear image through the lens).

Further, in the case of the first embodiment, the second eye lens 22 of the left-eye eye lens array 26 is provided in the body 12 so as to extend to the boundary of the field of vision of approximately 100 degrees outward of the eyeball e(L) in a forward-viewing state. In the case of the first embodiment, the second eye lens 22 is partly located out of sight beyond the boundary of the field of vision of approximately 100 degrees outward. Meanwhile, as shown in FIG. 3, when the line of sight S is tilted maximally outward (i.e. tilted at approximately 15 degrees outward), the second eye lens 22 is wholly located in sight.

The angle of view of θ1 of the first eye lens 18 needs only fall within a range of approximately 60 degrees to approximately 120 degrees (approximately 30 degrees to approximately 60 degrees both outward and toward the nose). The viewer is almost always looking forward when using the head-mounted display device 10. Therefore, the first eye lens 18 is placed at least within the discriminative field of vision A1 and effective field of vision A2, which are high in information discrimination capabilities, of the eyeball e(L) in a forward-viewing state. In a case where the angle of view θ1 is approximately 60 degrees, the first eye lens 18 is placed in the discriminative field of vision A1, the effective field of vision A2, and part of the inductive field of vision A3 in a horizontal direction. Further, in a case where the angle of view θ1 is approximately 120 degrees, the first eye lens 18 is placed in the discriminative field of vision A1, the effective field of vision A2, the inductive field of vision A3, and part of the auxiliary field of vision A4 in a horizontal direction.

It should be noted that, as shown in FIG. 3, the angle of view θ1 of the first eye lens 18 may be approximately 90 degrees or larger so that when the line of sight S is tilted maximally in a horizontal direction (i.e. tilted at approximately 15 degrees outward or toward the nose), the first eye lens 18 is located within the discriminative field of vision A1 and the effective field of vision A2. This causes the boundary between the first image projected by the first eye lens 18 and the second image projected by the second eye lens 22 to be located in the inductive field of vision A3 located outside of the effective field of vision A2. This makes the boundary between the first image and the second image less conspicuous to the viewer (than in a case where the boundary is located in the effective field of vision A2). This allows the viewer, as a result, to view the horizontally continuous first and second images as one image without a feeling of strangeness.

Further, although, in FIG. 2, the first eye lens 18 and the second eye lens 22 are placed so that the optical axis C1 and the second optical axis C2 intersect at a point located on the viewer's pupil p(L), this does not imply any limitation. For example, with consideration given to a case where the viewer's pupil p(L) has horizontally moved as shown in FIG. 3, the second eye lens 22 may be placed so that the optical axis C2 passes over the viewer's pupil p(L) that has horizontally moved. Furthermore, the first eye lens 18 and the second eye lens 22 may be placed so that the optical axis C1 and the second optical axis C2 do not lie in the same plane.

Figure 7:
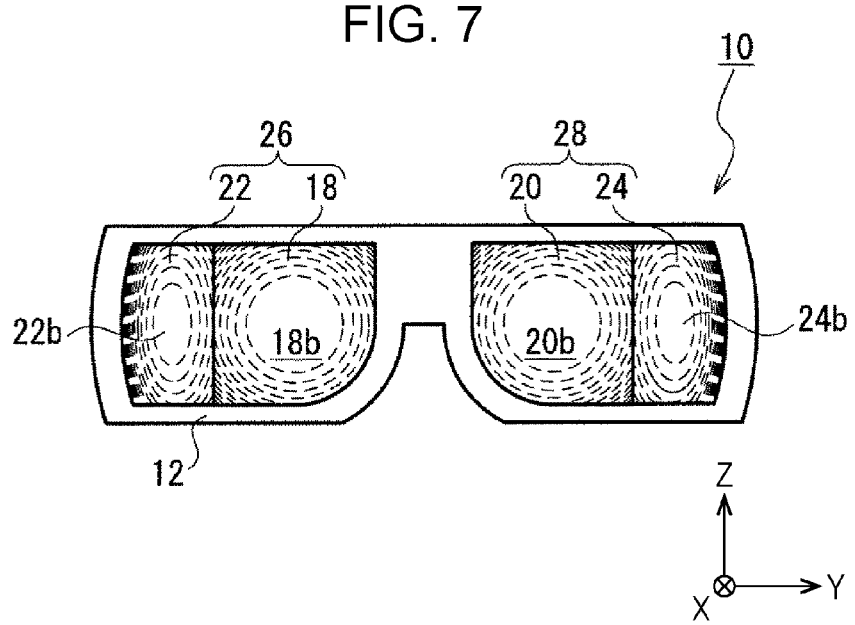
FIG. 7 is a diagram schematically showing the head-mounted display device as seen from the viewer.
Figure 8A:
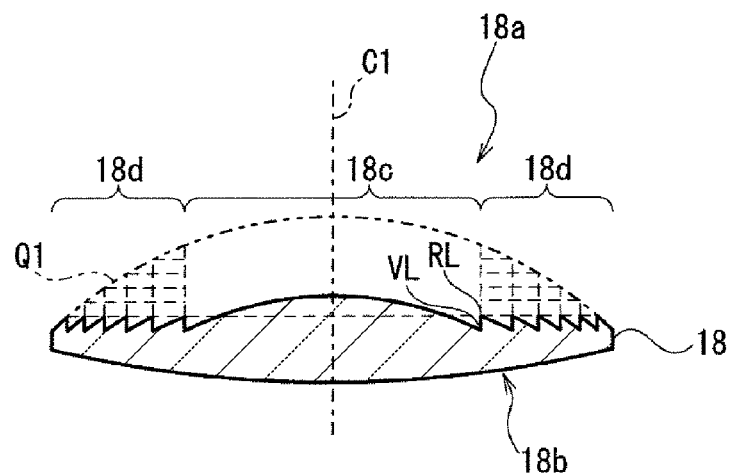
FIG. 8A is a cross-sectional view of a first eye lens.

FIG. 7 schematically shows the head-mounted display device 10 as seen from the viewer (i.e. from an angle along the X-axis). Specifically, FIG. 7 shows the left-eye eye lens array 26, which is a combination of the first eye lens 18 and the second eye lens 22, and the right-eye eye lens array 28, which is a combination of the first eye lens 20 and the second eye lens 24. Further, FIGS. 8A and 8B show the first eye lens 18, and FIGS. 9A and 9B show the second eye lens 22.

As shown in FIG. 7, the left-eye eye lens array 26 is configured (that is, the first eye lens 18 and the second eye lens 22 are placed) so that a viewer-side lens surface 18b of the first eye lens 18 and a viewer-side lens surface 22b of the second eye lens 22 are horizontally continuous in the whole or central part (e.g. at least the discriminative field of vision A1 and the effective field of vision A2 in a vertical direction) (approximately 20 degrees: an area of up to approximately 8 degrees upward and up to 12 degrees downward)) of the viewer's vertical field of vision as seen from the viewer.

Figure 8B:
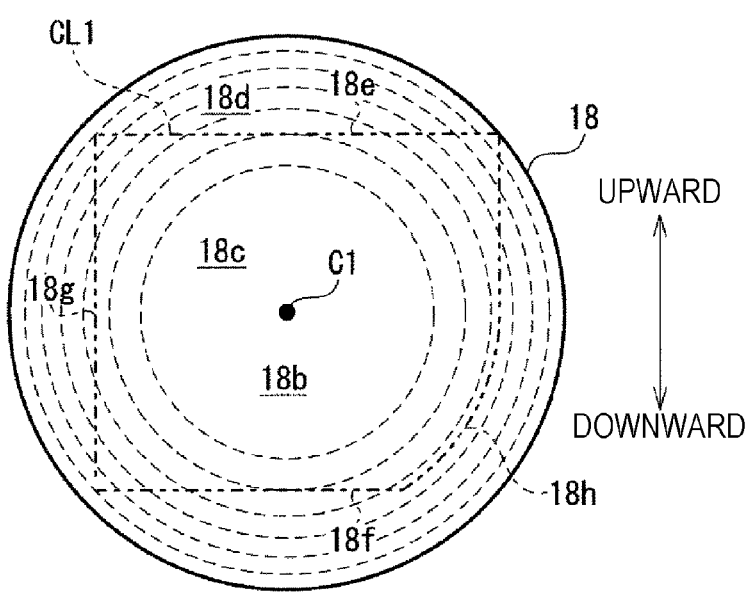
FIG. 8B is a top view of the first eye lens.
Figure 9A:
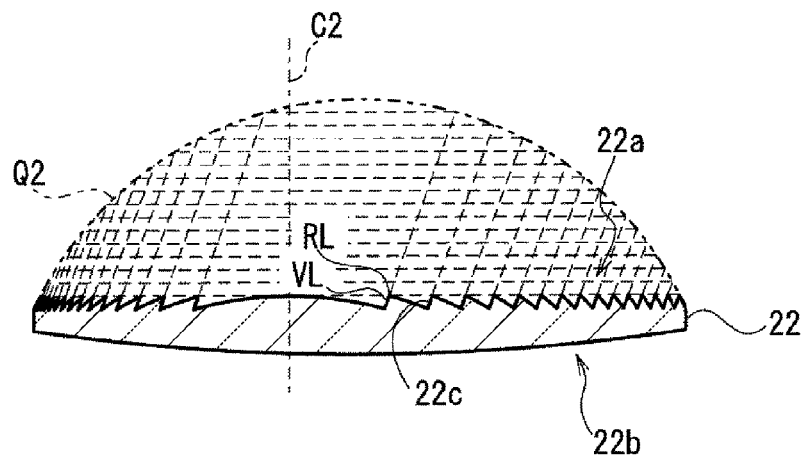
FIG. 9A is a cross-sectional view of a second eye lens.
Figure 9B:
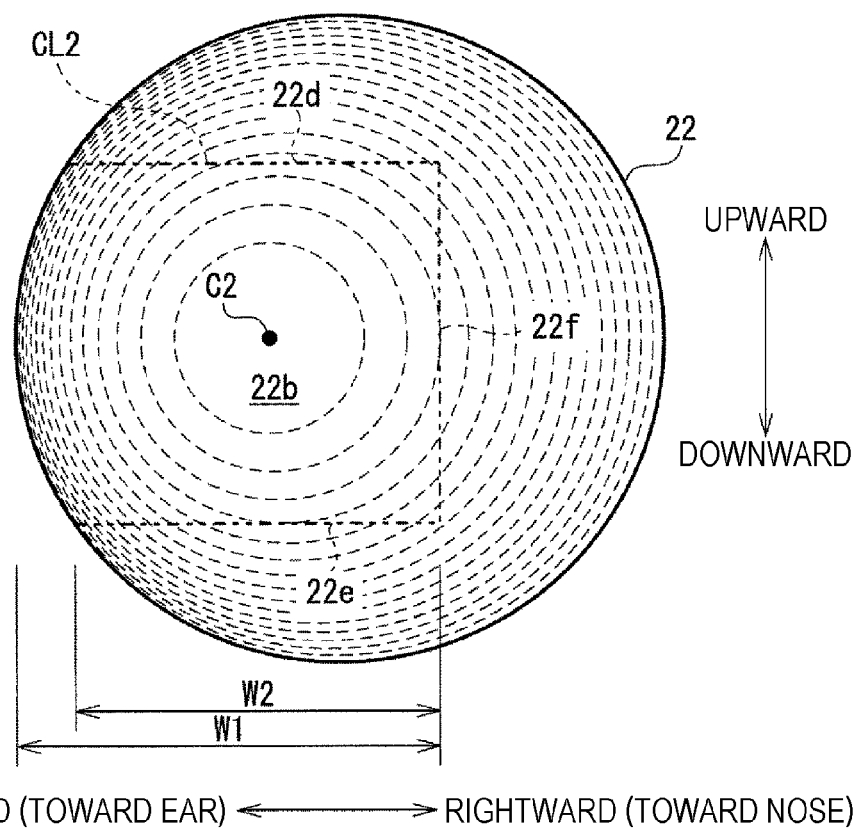
FIG. 9B is a top view of the second eye lens.

For that purpose, in the case of the first embodiment, as shown in FIGS. 8B and 9B, the first eye lens 18 and the second eye lens 22 are partly cut (i.e. include cut sections), and in the cut sections, the first eye lens 18 and the second eye lens 22 make contact with each other. FIGS. 8B and 9B show cutting lines CL1 and CL2 along which the first eye lens 18 and the second eye lens 22 are cut, respectively.

Specifically, the first eye lens 18 has its upper, lower, left (ear-side), and right (nose-side) parts cut off. This causes the first eye lens 18 to include an upper cut section 18e, a lower cut section 18f, a left cut section (i.e. a cut section that is on one side of the second eye lens 22) 18g, and a right cut section 18h.

Meanwhile, the second eye lens 22 has its upper, lower, and right (nose-side) parts cut off. This causes the second eye lens 22 to include an upper cut section 22d, a lower cut section 22e, and a right cut section (i.e. a cut section that is on one side of the first eye lens 18) 22f.

It should be noted that, as shown in FIG. 9B, a left part (ear-side part) of the second eye lens 22 that is farther from the first eye lens 18 is not cut off. Therefore, a left edge of the second eye lens 22 that is farther from the first eye lens 18 (i.e. that is opposite to the right cut section 22f) has a curved shape when seen from an angle along the optical axis C2. That is, the second eye lens 22 is substantially in the shape of the letter "D" when seen from an angle along the optical axis C2. As a result, a width W1 of the second eye lens 22 in a horizontal direction (lens radial direction) in the vertical middle is larger than a width W2 of the second eye lens 22 in a horizontal direction at the upper or lower edge. This allows the second eye lens 22 to be made compact in size by being partly cut and yet have a wide horizontal angle of view.

As mentioned above, cutting the first eye lens 18 and the second eye lens 22 and bringing them into contact with each other allows the viewer-side lens surface 18b of the first eye lens 18 and the viewer-side lens surface 22b of the second eye lens 22 to be horizontally continuous in the whole or central part of the viewer's vertical field of vision as seen from the viewer. Specifically, bringing the left cut section 18g of the first eye lens 18 and the right cut section 22f of the second eye lens 22 into contact with each other allows the viewer-side lens surface 18b of the first eye lens 18 and the viewer-side lens surface 22b of the second eye lens 22 to be horizontally continuous as shown in FIG. 7.

As a result, even if the line of sight S shifts upward or downward, the viewer can view the first image, transmitted through the first eye lens 18, and the second image, transmitted through the second eye lens 22, in a horizontally continuous state, i.e. as one image, without a feeling of strangeness.

It should be noted that, as shown in FIGS. 8B and 9B, the upper and lower parts of the first and second eye lenses 18 and 22, i.e. parts of the first and second eye lenses 18 and 22 that lie off the viewer's vertical field of vision as seen from the viewer (which, in the case of the first embodiment, is a field of vision of approximately 90 degrees), are cut off. This makes it possible to achieve reductions in weight and size of the first and second eye lenses 18 and 22. This makes it possible, as a result, to achieve reductions in weight and size of the head-mounted display device 10.

As shown in FIGS. 8A and 8B, the first eye lens 18 at least partly includes a Fresnel lens section on a display-side lens surface 18a of the first eye lens 18. In the case of the first embodiment, the first eye lens 18 includes a convex lens section 18c and a Fresnel lens section 18d on the display-side lens surface 18a of the first eye lens 18. Further, the first eye lens 18 includes a convex lens section on the viewer-side lens surface 18b.

Specifically, the convex lens section 18c is placed in the center of the display-side lens surface 18a, and the Fresnel lens section 18d is placed outside the convex lens section 18c. Further, an optical axis of the convex lens section 18c and an optical axis of the Fresnel lens section 18d coincide with the optical axis C1 of the first eye lens 18. That is, the display-side lens surface 18a of the first eye lens 18 has a rotation symmetrical shape centered at the optical axis C1.

Further, in the case of the first embodiment, as shown in FIG. 2, the convex lens section 18c of the first eye lens 18 is located within the discriminative field of vision A1 and effective field of vision A2 of the eyeball e(L) in a forward-viewing state. For example, the convex lens section 18c has an angle of view α of 100 degrees or smaller. Therefore, the Fresnel lens section 18d placed outside the convex lens section 18c is located within the inductive field of vision A3 located outside of the effective field of vision A2. This is because the presence of the Fresnel lens section 18d in the discriminative field of vision A1 or the effective field of vision A2 may cause a plurality of annular ridge lines RL and valley lines VL, shown in FIGS. 8A and 8B, of the Fresnel lens section 18d to be conspicuous to the viewer as annular stripes. This may result in impairment of the realistic effect.

Such a first eye lens 18 causes the first image displayed in the first display area 14b of the display 14 to be projected with magnification onto the pupil p(L) of the viewer's eyeball e(L). Further, by at least partly including the Fresnel lens section 18d, the first eye lens 18 can be made thinner and can thereby be made lighter in weight and smaller in size. For example, the first eye lens 18 can be made thinner than an eye lens including a concave lens section Q1 that is optically equivalent to the Fresnel lens section 18d and can thereby be made lighter in weight and smaller in size.

As shown in FIG. 9B, the second eye lens 22 at least partly includes a Fresnel lens section on a display-side lens surface 22a of the second eye lens 22. Further, the second eye lens 22 includes a convex lens section on the viewer-side lens surface 22b.

In the case of the first embodiment, the Fresnel lens section 22a of the second eye lens 22 does not have a rotation symmetrical shape centered at the optical axis C2. Specifically, as shown in FIG. 9B, the centers of a plurality of annular ridge lines RL and valley lines VL of the Fresnel lens section 22a do not coincide with the optical axis C2 of the second eye lens 22. Further, a rising surface 22c between a ridge line RL and a valley line VL is not parallel to but tilted with respect to the optical axis C2.

Figure 10:
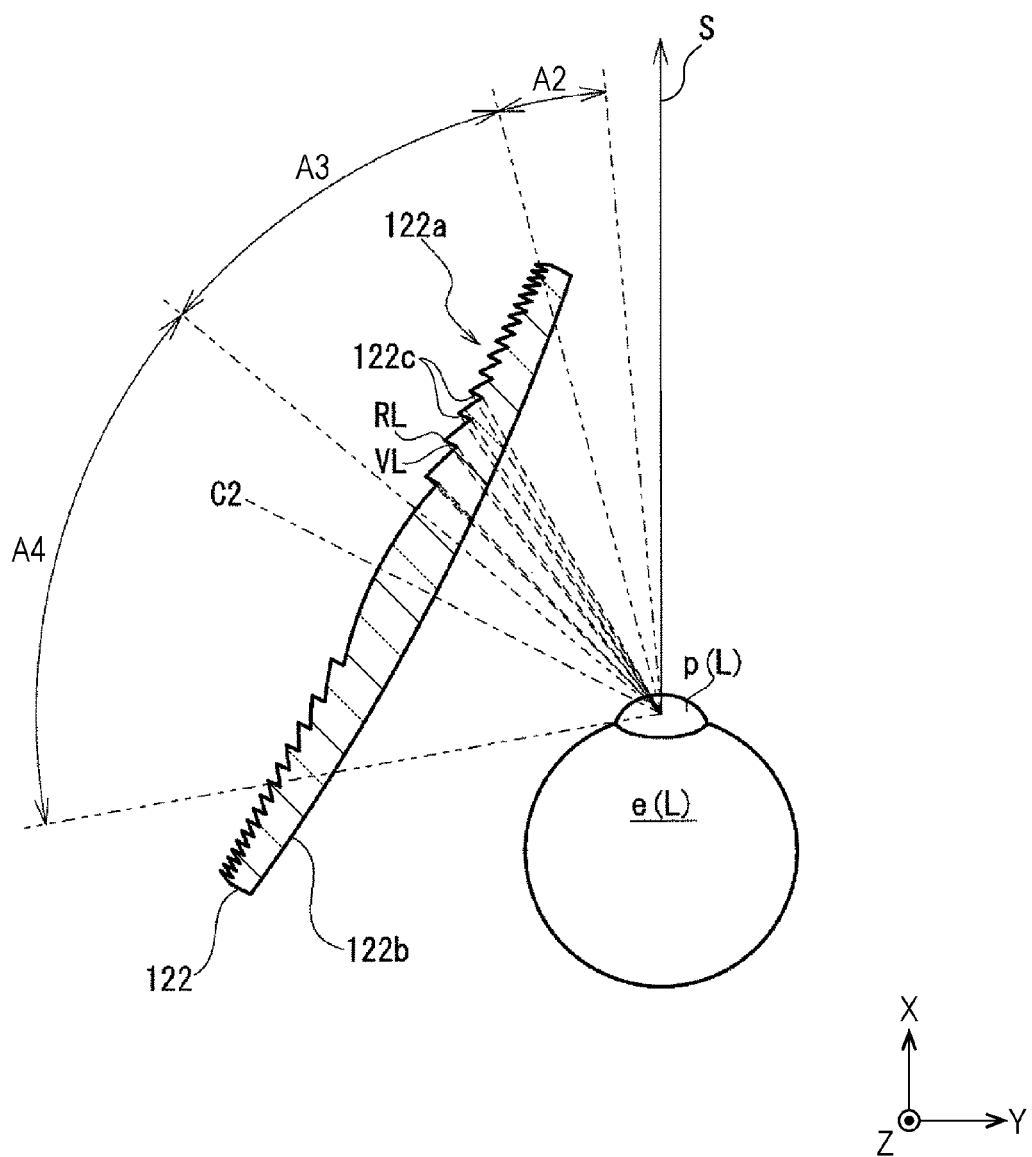
FIG. 10 is a diagram showing a Fresnel lens of a comparative example.
Figure 11:
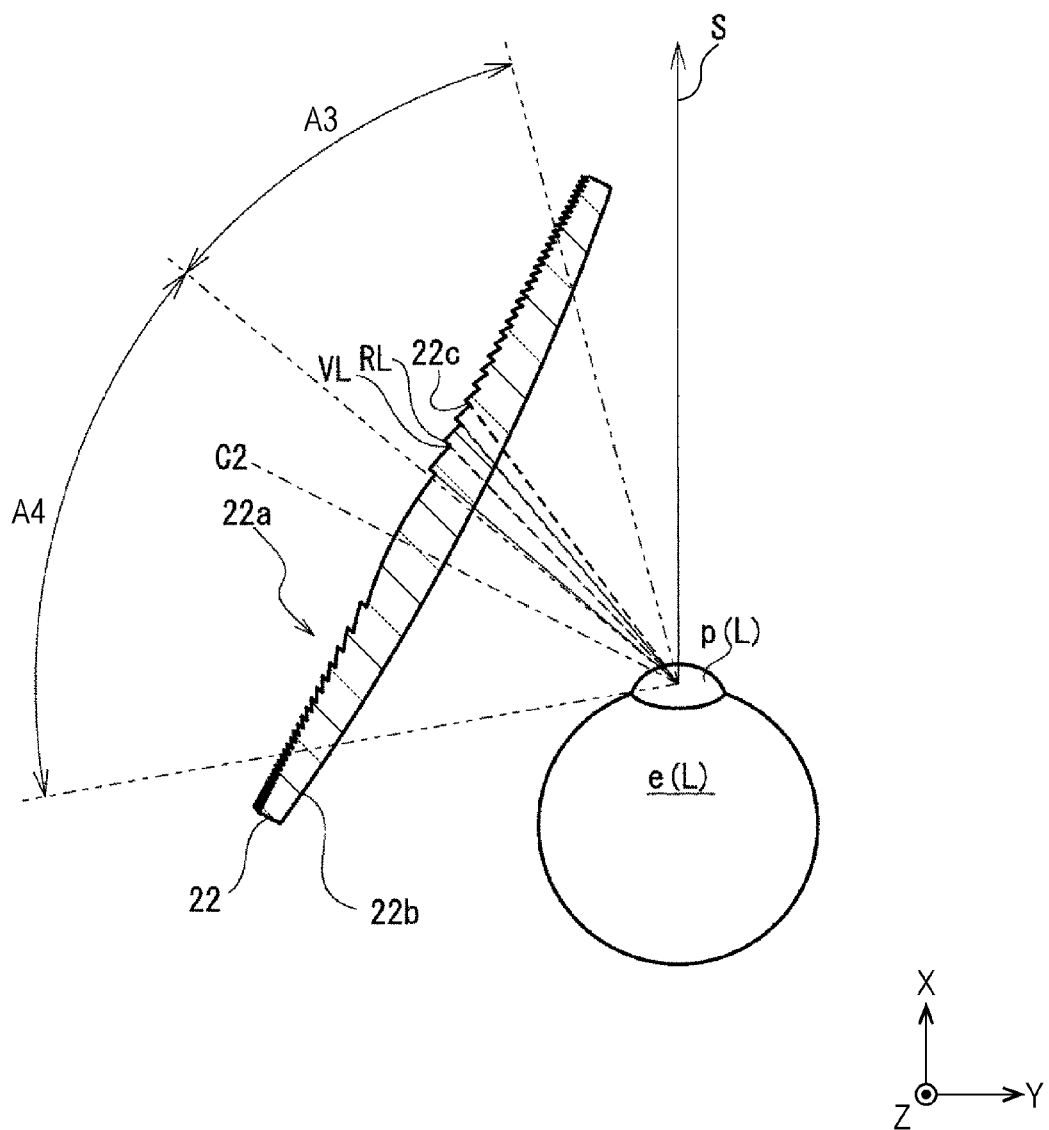
FIG. 11 is a diagram showing the second eye lens according to the embodiment.

A reason why the Fresnel lens section 22a of the second eye lens 22 has such a rotation asymmetrical shape is given with reference to FIGS. 10 and 11.

FIG. 10 shows a Fresnel lens 122 of a comparative example. It should be noted that the Fresnel lens 122 of the comparative example shown in FIG. 10 has a rotation symmetrical shape centered at the optical axis C2 and includes rising surfaces 122c that are parallel to the optical axis C2. FIG. 11 shows the second eye lens 22 according to the first embodiment.

As shown in FIG. 10, when the viewer is looking forward, the optical axis C2 of the Fresnel lens 122 is tilted with respect to the line of sight S. That is, the viewer is looking obliquely at a viewer-side lens surface 122b of the Fresnel lens 122. At this time, in the inductive field of vision A3 of the eyeball e(L) in a forward-viewing state, the rising surfaces 122c of the Fresnel lens 122 face the pupil p(L). Specifically, the rising surfaces 122c are tilted with respect to a straight line connecting the ridge line RL with the pupil p(L) and a straight line connecting the valley line VL with the pupil p(L). Therefore, the annular ridge and valley lines RL and VL do not overlap each other and are projected as high-density annular stripes onto the retina of the eyeball e(L), and these high-density annular stripes are easily noticed by the viewer.

Meanwhile, as shown in FIG. 11, in the case of the second eye lens 22 of the first embodiment, in an area of the field of vision A3 that is next to the auxiliary field of vision A4 of the eyeball e(L) in a forward-viewing state, the rising surface 22c of the Fresnel lens section 22a hardly faces the pupil p(L). Specifically, the rising surface 22c overlaps substantially parallel to a straight line connecting the ridge line RL with the pupil p(L) and a straight line connecting the valley line VL with the pupil p(L). That is, the rising surface 22c is tilted with respect to the optical axis C2 of the second eye lens 22 (that is, the Fresnel lens section 22a of the second eye lens 22 has a rotation asymmetrical shape) so that the rising surface 22c in the Fresnel lens section 22 of the second eye lens 22 on the side of the first eye lens 18 does not face the pupil p(L) in a forward-viewing state. Therefore, the annular ridge and valley lines RL and VL overlap each other and are projected as low-density annular stripes onto the retina of the eyeball e(L), and these low-density annular stripes are hardly noticed by the viewer.

It should be noted that, as shown in FIG. 11, in the inductive field of vision A3, the rising surface 22c of the Fresnel lens section 22a hardly faces the pupil p(L), but in the auxiliary field of vision A4, a rising surface 22c faces the pupil p(L). However, since the viewer has lower information discrimination capabilities in the auxiliary field of vision A4 than in the inductive field of vision A3, the annular ridge and valley lines RL and VL are hardly noticed by the viewer.

Such a second eye lens 22 causes the second image displayed in the second display area 14c of the display 14 to be projected with magnification onto the pupil p(L) of the viewer's eyeball e(L). Further, by at least partly including the Fresnel lens section 22a, the second eye lens 22 can be made lighter in weight and smaller in size. For example, as shown in FIGS. 9A and 9B, the second eye lens 22 can be made lighter in weight and smaller in size than an eye lens including a concave lens section Q2 that is optically equivalent to the Fresnel lens section 22a.

Furthermore, the distance between the first eye lens 18 and the first display area 14b of the display 14 and the distance between the second eye lens 22 and the second display area 14c of the display 14 are set on the basis of the visual characteristics, shown in FIGS. 5 and 6, of the viewer, i.e. a human. This is described with reference to FIG. 12.

Figure 12:
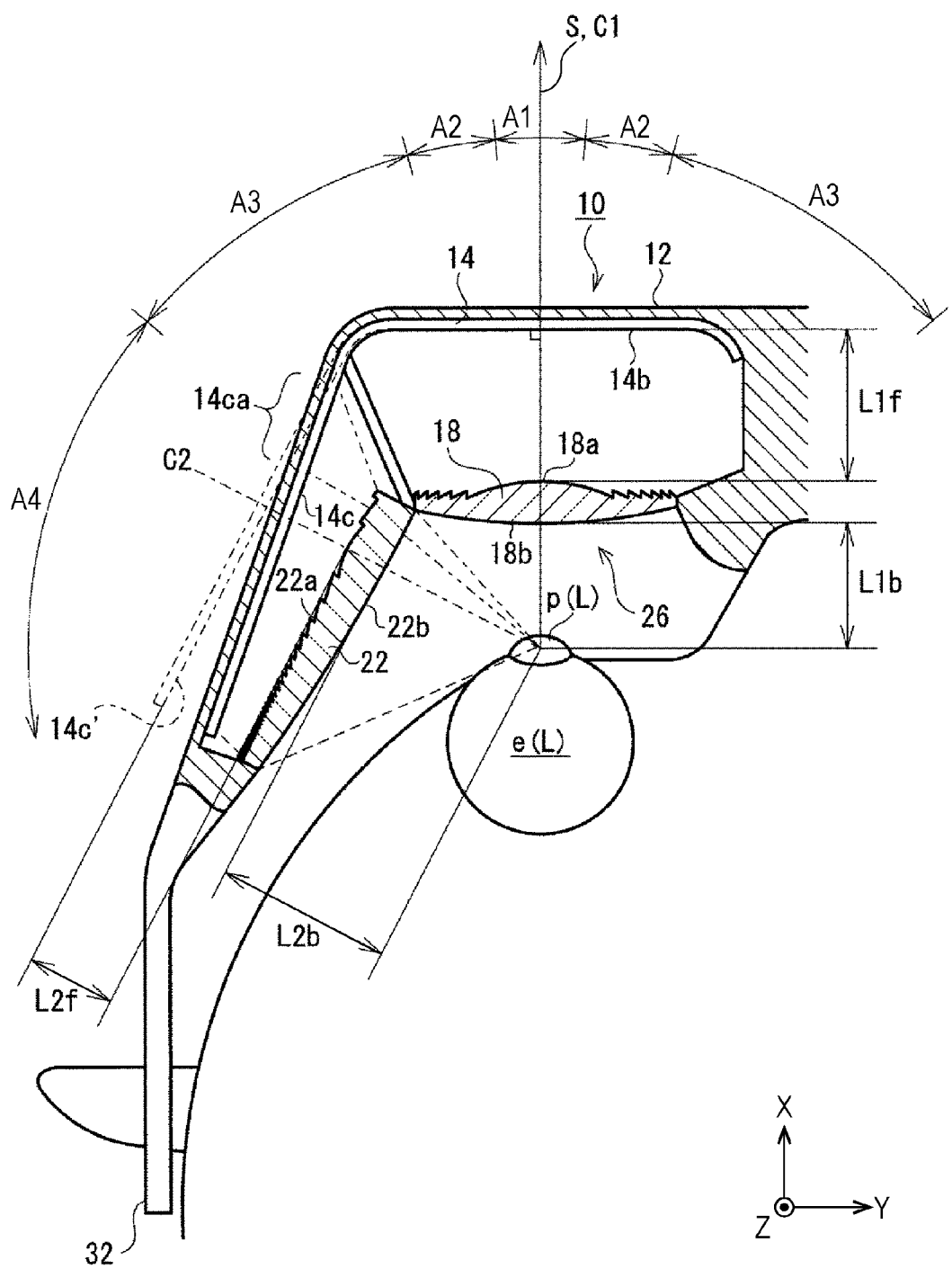
FIG. 12 is a diagram for explaining the distance between the display and an eye lens.

First, in the case of the first embodiment, as shown in FIG. 12, the distance between the second eye lens 22 and the second display area 14c of the display 14 is shorter than the distance between the first eye lens 18 and the first display area 14b of the display 14. That is, the first eye lens 18 and the second eye lens 22 have different optical properties from each other that make it possible to keep these distances. This leads to a reduction in size of the head-mounted display device 10, particularly in transverse size, and as a result to a reduction in weight of the head-mounted display device 10.

Further, as shown in FIG. 12, the optical axis C1 of the first eye lens 18 is substantially orthogonal to the first display area 14b of the display 14. The distance between the first eye lens 18 and the first display area 14b is a distance $L1f$ that is needed for the first image displayed in the first display area 14b to be formed on the retina of the eyeball e(L) (i.e. that is needed for the viewer to view the first image with clarity). The distance $L1f$ is determined by the distance $L1b$ between the first eye lens 18 and the pupil p(L) and the optical properties of the first eye lens 18.

Meanwhile, the optical axis C2 of the second eye lens 22 is not orthogonal to the second display area 14c of the display 14. Specifically, the second display area 14c is placed so that a part of the second display area 14c that is farther from the first display area 14b comes closer to the second eye lens 22 than a part of the second display area 14c that is closer to the first display area 14b. A reason for this is given here.

In FIG. 12, a second display area 14c' of the display 14 of the comparative example is indicated by a chain double-dashed line. The optical axis C2 of the second eye lens 22 is orthogonal to the second display area 14c' of the display 14 of the comparative example. The distance between the second eye lens 22 and the second display area 14c' of the comparative example is a distance $L2f$ that is needed for a second image displayed in the second display area 14c' of the comparative example to be formed on the retina of the pupil p(L). The distance $L2f$ is determined by the distance $L2b$ between the second eye lens 22 and the pupil p(L) and the optical properties of the second eye lens 22.

In the case of the first embodiment, the second display area 14c of the display 14 is positioned with respect to the second eye lens 22 so that at least part of the second display area 14c is located closer to the second eye lens 22 than the second display area 14c' of the comparative example. That is, at least part of the second display area 14c is located closer to the second eye lens 22 than a position at which the second image is formed on the retina of the eyeball e(L).

In the case of the first embodiment, a part of the second display area 14c of the display 14 that is closer to the first display 14b, i.e. a part 14c a that projects part of the second image onto a part of the second eye lens 22 that lies within the inductive field of vision A3 of the eyeball e(L) in a forward-viewing state, is substantially located in a position at the distance $L2f$ from the second eye lens 22. The other part of the second display area 14c of the display 14 (that is farther from the first display 14b), i.e. a part that projects the remaining part of the second image onto a part of the second eye lens 22 that lies within the auxiliary field of vision A4, is located at a shorter distance from the second eye lens 22 than the distance $L2f$.

Therefore, the part of the second image displayed in the part that is farther from the first display 14b is blurredly projected onto the retina of the eyeball e(L) through the part of the second eye lens 22 that lies within the auxiliary field of vision A4. However, no problem arises here, as the viewer (i.e. a human), by nature, cannot definitely identify a target that lies within the auxiliary field of vision A4. Meanwhile, bringing the second display area 14c of the display 14 closer to the second eye lens 22 allows the head-mounted display device 10 to be smaller in transverse size and, as a result, lighter in weight than in the case of the second display area 14c' of the comparative example.

It should be noted that, in the case of the first embodiment, as shown in FIG. 12, part of the second eye lens 22 is located within the inductive field of vision A3 of the eyeball e(L) in a forward-viewing state. Therefore, the second display area 14c of the display 14 is partly located at a shorter distance from the second eye lens 22 than the distance L2f from the second eye lens 22 at which the second image is formed on the retina of the eyeball e(L). However, this is not always the case in a case where the second eye lens 22 is located only within the auxiliary field of vision A4 (i.e. in a case where the angle of view θ1 of the first eye lens 18 is 100 degrees or larger (in a case where the first eye lens 18 is located in the discriminative field of vision A1, the effective field of vision A2, and the inductive field of vision A3)). In this case, the second display area 14c that displays the second image that is projected onto the second eye lens 22 located only within the auxiliary field of vision A4 may be wholly located at a shorter distance from the second eye lens 22 than the distance L2f.

The foregoing has so far described the optical systems of the head-mounted display device 10 according to the first embodiment. The following describes image processing of images that are displayed on the displays 14 and 16.

Figure 13:
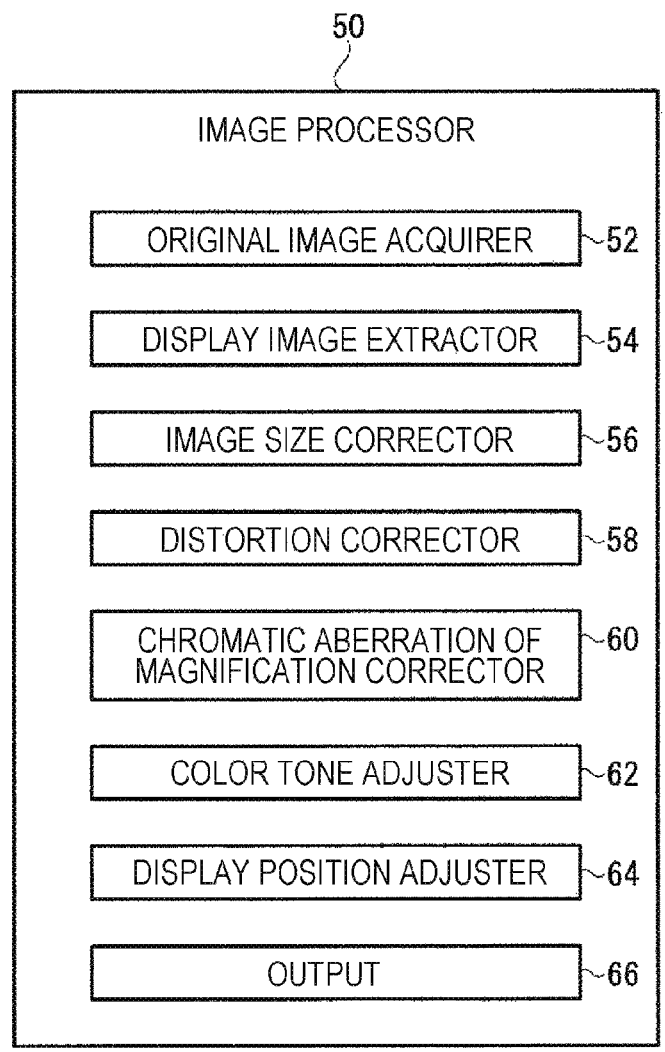
FIG. 13 is a diagram showing a configuration of an image processor of the head-mounted display device.

The head-mounted display device 10 according to the first embodiment includes an image processor 50 shown in FIG. 13. The image processor 50 includes an original image acquirer 52, a display image extractor 54, an image size corrector 56, a distortion corrector 58, a chromatic aberration of magnification corrector 60, a color tone adjuster 62, a display position adjuster 64, and an output 66.

The image processor 50 includes, for example, at least a CPU, a memory, and a circuit board on which the CPU and the memory are mounted. In the memory, a program for image processing and images are stored. By operating in accordance with the program, the CPU and the memory function as each of the constituent elements 52 to 66 of the image processor 50. Each of the constituent elements is described here.

Figure 14:
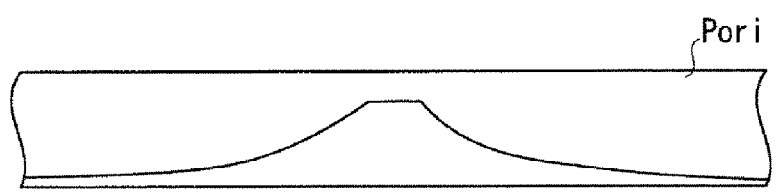
FIG. 14 is a diagram showing a 360-degree panoramic image.

The original image acquirer 52 of the image processor 50 acquires, from an external device (not illustrated), an original image that serves as a basis for an image that is presented to the viewer from the head-mounted display device 10. For example, as shown in FIG. 14, the original image acquirer 52 acquires an original image Pori, which is a 360-degree panoramic image, from the external device. For that purpose, the image processor 50 is connected to the external device, for example, via an HDMI (registered trademark) (high-definition multimedia interface) cable.

The display image extractor 54 of the image processor 50 extracts, from the original image Pori acquired by the original image acquirer 52, first and second images P1(L), P2(L), P1(R), and P2(R) that are displayed on the displays 14 and 16, respectively. That is, as shown in FIG. 1, the display image extractor 54 extracts a left-eye first display image P1(L) that is displayed in the first display area 14b of the left-eye display 14, a left-eye second image P2(L) that is displayed in the second display area 14c, a right-eye first image P1(R) that is displayed in the first display area 16b of the right-eye display 16, and a right-eye second image P2(R) that is displayed in the second display area 16c.

Figure 15:
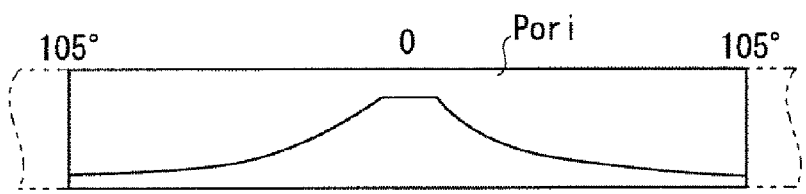
FIG. 15 is a diagram showing an area in an angular range of 210 degrees.
Figure 16:
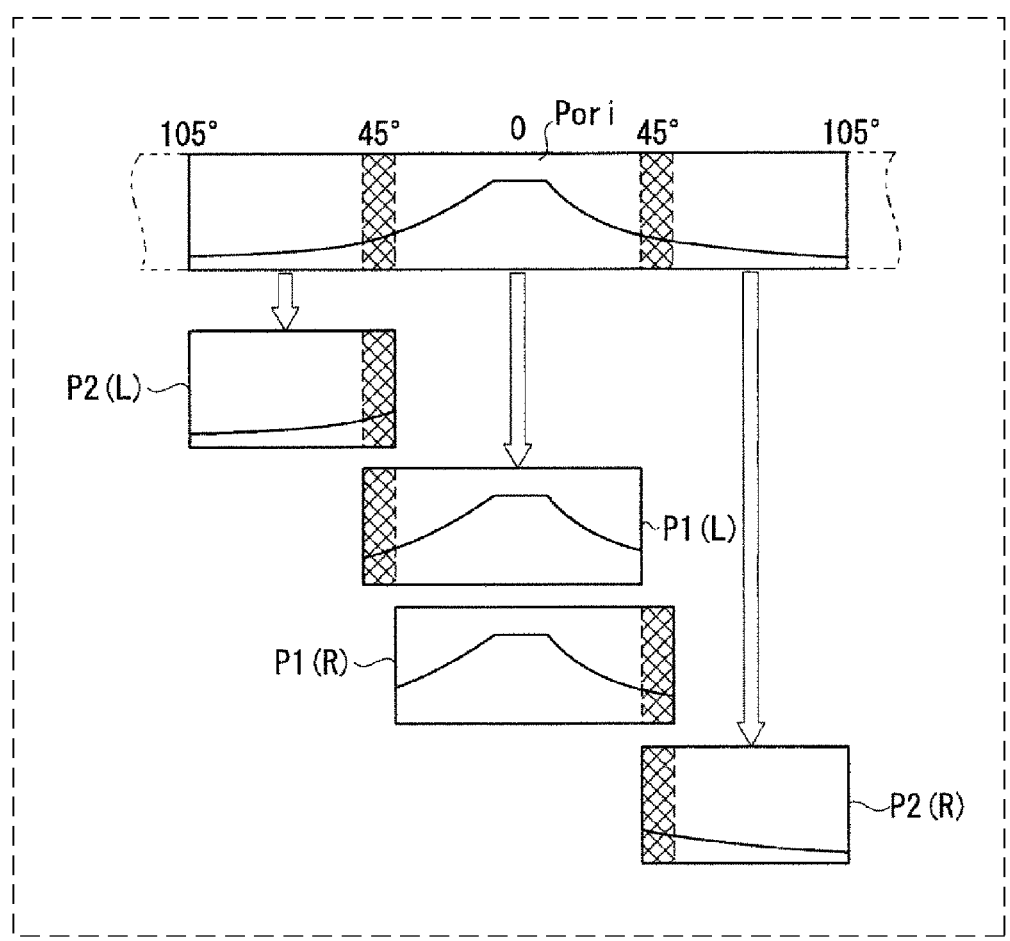
FIG. 16 is a diagram for explaining extraction of first and second images that are displayed on displays.

Specifically, first, as shown in FIG. 16, the display image extractor 54 extracts the left-eye first and second images P1(L) and P2(L) and the right-eye first and second images P1(R) and P2(R) from an area of the 360-degree panoramic image Pori that falls within a range of 210 degrees as shown in FIG. 15. That is, the display image extractor 54 extracts an image that extends over the entire horizontal field of vision of the viewer.

It should be noted that, as shown in FIG. 16, the left-eye first image P1(L) and the right-eye first image P1(R) are substantially the same images that are displayed in front of the left and right eyes, respectively. Specifically, the left-eye first image P1(L) and the right-eye first image P1(R) are images shifted leftward and rightward from each other by very small shift lengths in view of parallax so as to look natural to the viewer.

The display image extractor 54 of the image processor 50 also extracts these four images from the original image Pori so that the second images P2(L) and P2(R) that the viewer views through the second eye lenses 22 and 24 is smaller in horizontal size than the first images P1(L) and P1(R) that the viewer views through the first eye lenses 18 and 20.

In the case of the first embodiment, the display image extractor 54 extracts the left-eye and right-eye first images P1(L) and P1(R) in sizes falling within an angular range of approximately 90 degrees and extracts the left-eye and right-eye second images P2(L) and P2(R) in sizes falling within an angular range of approximately 60 degrees. The angular range of each of the first images P1(L) and P1(R) corresponds to the angle of view θ1 of approximately 90 degrees of each of the first eye lenses 18 and 20, and the angular range of each of the second images P2(L) and P2(R) corresponds to the angle of view θ2 of approximately 60 degrees of each of the second eye lenses 22 and 24.

This causes the boundary between the left-eye first image P1(L) and the left-eye second image P2(L) to be located on the outer side (left side) of the central field of vision, which is high in information discrimination capabilities. This makes it harder, as a result, for the boundary to be visually identified by the viewer than in a case where the angular range of the second image P2(L) is larger than the angular range of the first image P1(L). Similarly, the boundary between the right-eye first image P1(R) and the right-eye second image P2(R) is located on the outer side (right side) of the central field of vision. This makes it harder, as a result, for the boundary to be visually identified by the viewer than in a case where the angular range of the second image P2(R) is larger than the angular range of the first image P1(R).

The display image extractor 54 of the image processor 50 further extracts the left-eye first and second images P1(L) and P2(L) from the original image Pori so that the left-eye first and second images P1(L) and P2(L) have common parts (cross-hatched parts) as shown in FIG. 16. Further, the display image extractor 54 of the image processor 50 extracts the right-eye first and second images P1(R) and P2(R) from the original image Pori so that the right-eye first and second images P1(R) and P2(R) have common parts (cross-hatched parts). A reason for this is given by taking the left-eye first and second images P1(L) and P2(L) as an example and with reference to FIGS. 17 and 18.

Figure 17:
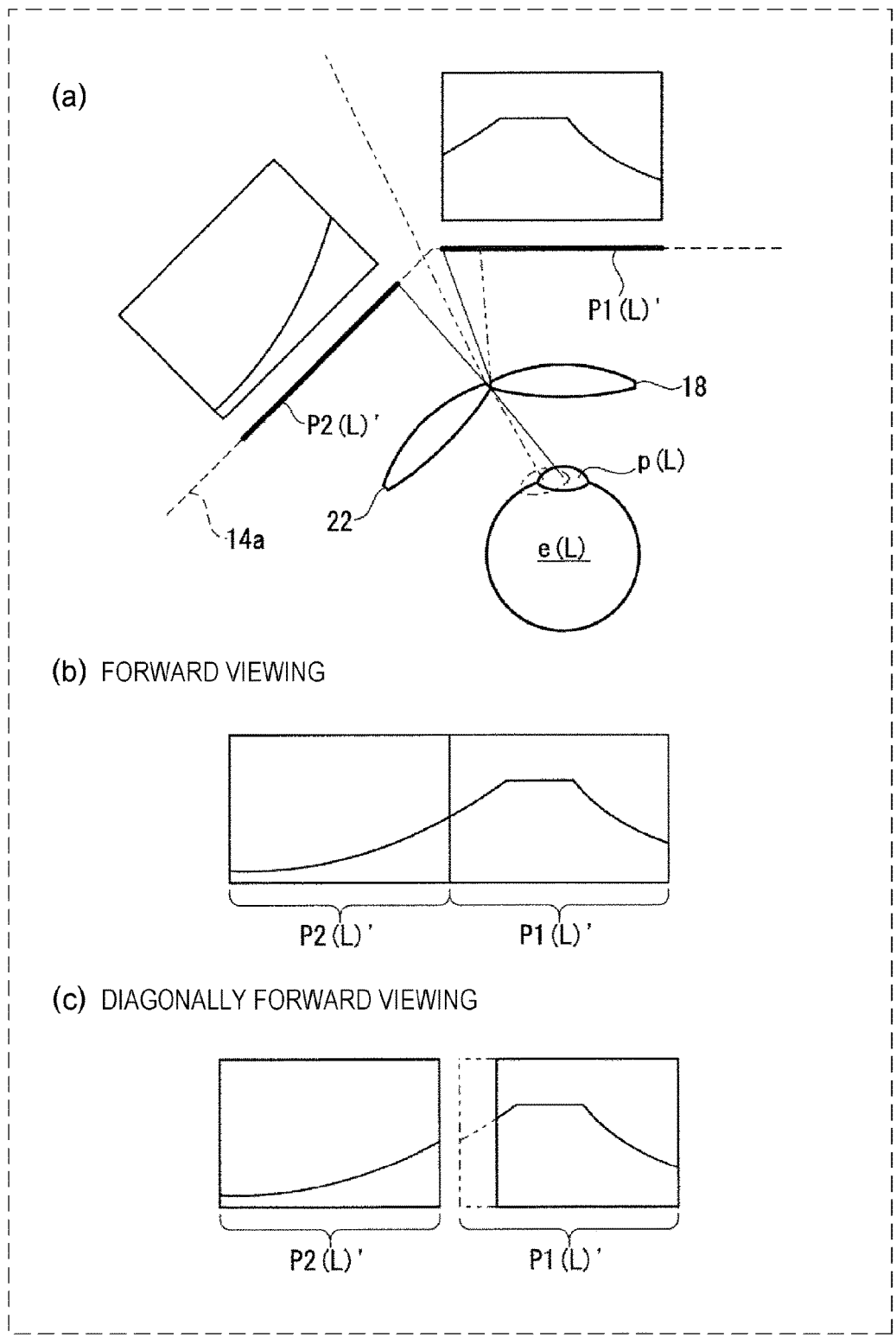
FIG. 17 illustrates diagrams showing how first and second images of the comparative example look.
Figure 18:
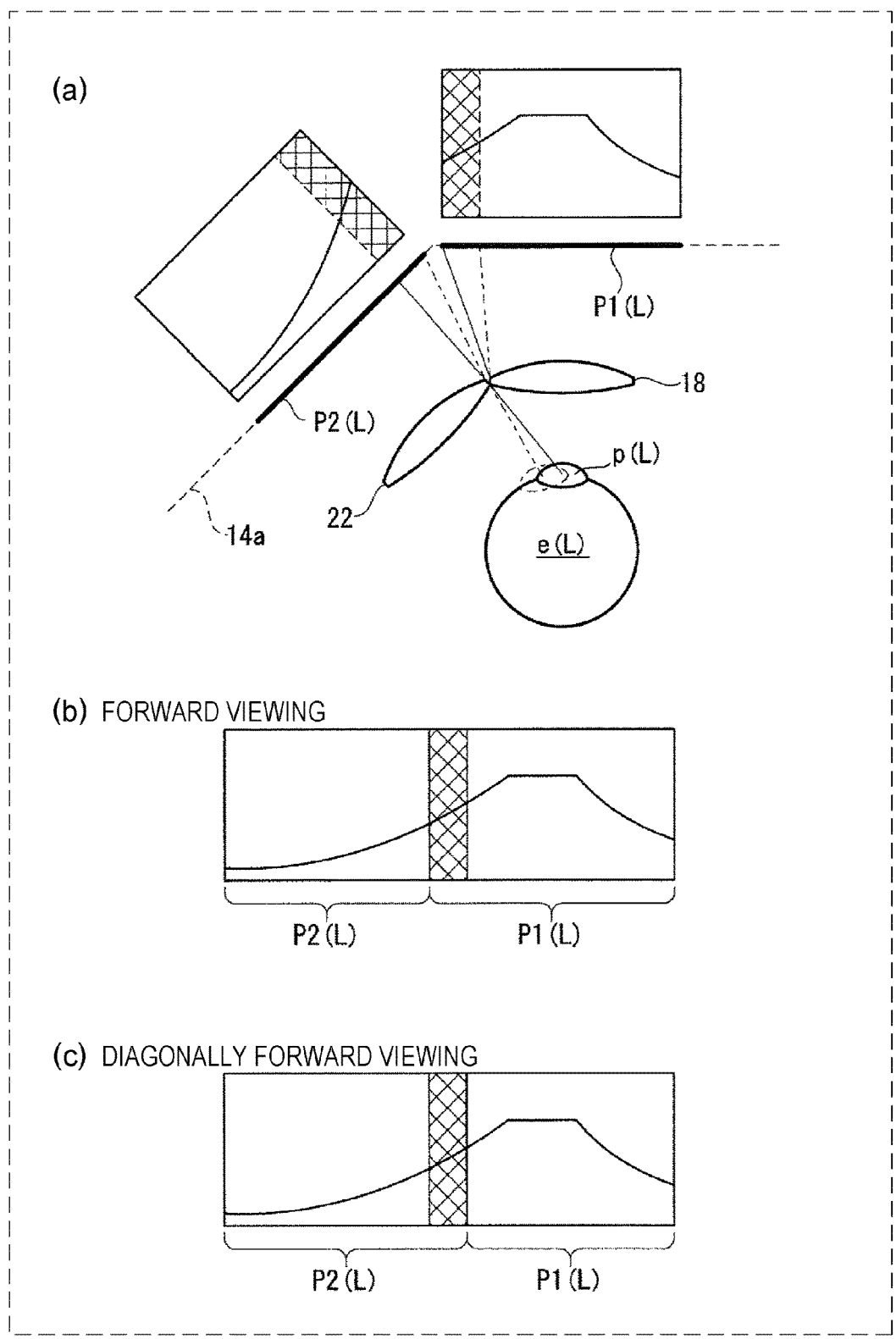
FIG. 18 illustrates diagrams showing how the first and second images according to the embodiment look.

FIG. 17 shows left-eye first and second images P1(L)' and P2(L)' of the comparative example that do not have common parts. Meanwhile, FIG. 18 shows the left-eye first and second images P1(L) and P2(L) according to the first embodiment, which have common parts.

FIG. 17(a) shows a positional relationship between the first and second images P1(L)' and P2(L)', the first and second eye lenses 18 and 22, and the eyeball e(L). When the viewer is looking forward (solid line), the first and second images P1(L)' and P2(L)' look continuous to the viewer as shown in FIG. 17(b).

When the viewer shifts his/her line of sight diagonally forward (chain double-dashed line), the first and second images P1(L)' and P2(L)' look to the viewer as if they were separated and a part of the first image P1(L)' that is next to the second image P2(L)' were missing as shown in FIG. 17(c).

This occurs because, as shown in FIG. 17(a), the viewer's shifting his/her line of sight diagonally forward (chain double-dashed line) causes the viewer to look at a different area on the display screen 14a of the display 14 through the first and second eye lenses 18 and 22. Therefore, such a phenomenon occurs that while the first and second images P1(L)' and P2(L)' look continuous in the case of forward viewing, these two images look discontinuous in the case of diagonally forward viewing.

With consideration given to the fact that the viewer's shifting his/her line causes the viewer to look at a different area on the display screen 14a of the display 14 through the first and second eye lenses 18 and 22, the first and second images P1(L) and P2(L) according to the first embodiment include common parts (cross-hatched parts) as shown in FIG. 18(a). The first image P1(L) includes its common part on the side of the second image P2(L), and the second image P2(L) includes its common part on the side of the first image P1(L).

When the viewer is looking forward (solid line), the first image P1(L) including its common part and the second image P2(L) whose common part is missing look continuous to the viewer as shown in FIG. 18(b).

When the viewer is looking diagonally forward (chain double-dashed line), the first image P1(L) whose common part is missing and the second image P2(L) including its common part look continuous to the viewer as shown in FIG. 18(c).

Therefore, by including common parts (cross-hatched parts), the first image P1(L) and the second image P2(L) look continuous to the viewer even in the case of a shift in the line of sight.

With continued reference to FIG. 13, the image size corrector 56 of the image processor 50 corrects the first images P1(L) and P1(R) and the second images P2(L) and P2(R) so that the second images P2(L) and P2(R) become smaller than the first images P1(L) and P1(R).

As shown in FIG. 1, in the left-eye optical system, the distance between the second display area 14c of the display 14 and the second eye lens 22 is shorter than the distance between the first display area 14b of the display 14 and the first eye lens 18. Therefore, in a case where the first image P1(L), which is displayed in the first display area 14b, and the second image P2(L), which is displayed in the second display area 14c, is identical in size, the second image P2(L) is more magnified than the first image P1(L) and projected onto the retina of the viewer's eyeball e(L). Similarly, in the right-eye optical system, too, the second image P2(R) is more magnified than the first image P1(R) and projected onto the retina of the viewer's eyeball e(R).

Figure 19:
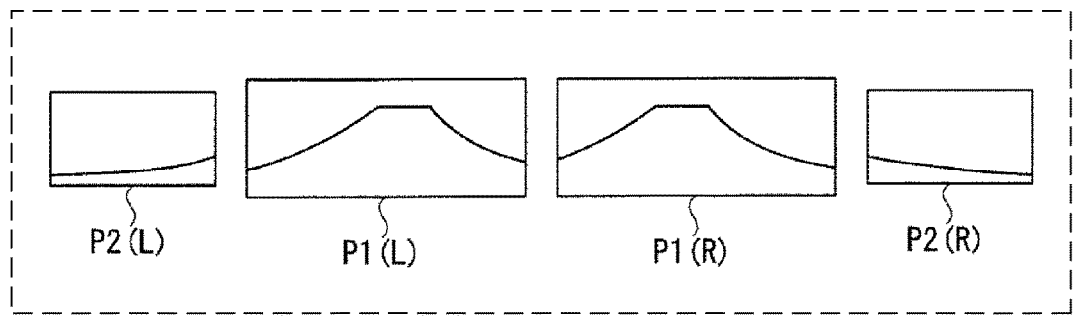
FIG. 19 is a diagram for explaining size corrections to the first and second images.

To address this problem, the image size corrector 56 corrects the first images P1(L) and P1(R) and the second images P2(L) and P2(R) so that the second images P2(L) and P2(R) become smaller than the first images P1(L) and P1(R) as shown in FIG. 19 and thus these four images become identical in size on the retinas of the eyeballs e(L) and e(R). For example, the image size corrector 56 scales down the second images P2(L) and P2(R) or scales up the first images P1(L) and P1(R). The degree to which the images are scaled down or scaled up is determined by the optical properties of the first and second eye lenses 18, 20, 22, and 24. This allows the viewer to view the second image P2(L), the first image P1(L), the first image P1(R), and the second image P2(R) in a continuous state without a feeling of strangeness.

With continued reference to FIG. 13, the distortion corrector 58 and chromatic aberration of magnification corrector 60 of the image processor 50 correct the first and second images P1(L), P1(R), P2(L), and P2(R) on the basis of the aberration properties of the first and second eye lenses 18, 20, 22, and 24.

Aberrations caused by lenses fall into two broad categories: distortions that are aberrations caused by monochromatic light as well and chromatic aberrations of magnification caused by differences in wavelength of light. The distortion corrector 58 and the chromatic aberration of magnification corrector 60 correct the first and second images P1(L), P1(R), P2(L), and P2(R) so as to balance out (i.e. cancel out) these distortions and chromatic aberrations of magnification caused by the lenses. That is, the distortion corrector 58 and the chromatic aberration of magnification corrector 60 correct the first and second images P1(L), P1(R), P2(L), and P2(R) so that these four images are projected onto the retinas of the eyeballs e(L) and e(R) through the first and second eye lenses 18, 20, 22, and 24, respectively, at substantially the same level as they would if aberration-free ideal lenses were used.

Take, as an example, a case where the first and second eye lenses 18, 20, 22, and 24 cause distortions in which, as shown in FIG. 19, the rectangular first and second images P1(L), P1(R), P2(L), and P2(R) are distorted into pincushion shapes and projected onto the retinas of the eyeballs e(L) and e(R).

Figure 20:
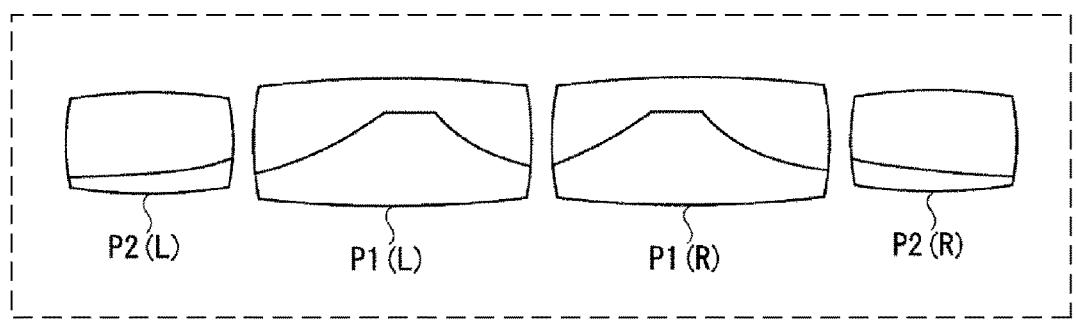
FIG. 20 is a diagram for explaining examples of distortion corrections to the first and second images.

In this case, the distortion corrector 58 corrects the first and second images P1(L), P1(R), P2(L), and P2(R) into barrel shapes as shown in FIG. 20. This causes these barrel-shaped first and second images to be distorted into rectangular shapes and projected onto the retinas of the eyeballs e(L) and e(R) by the first and second eye lenses 18, 20, 22, and 24. This balances out (i.e. cancels out) the distortions in which the images are distorted into pincushion shapes.

The chromatic aberration of magnification corrector 60 corrects the RGB values of pixels of the first and second images P1(L), P1(R), P2(L), and P2(R) as chromatic aberration of magnification corrections. Specifically, the chromatic aberration of magnification corrector 60 makes chromatic aberration of magnification corrections to the first and second images P1(L), P1(R), P2(L), and P2(R) so that the RGB values of the pixels of these four images after the occurrence of chromatic aberrations by the first and second eye lenses 18, 20, 22, and 24 are substantially equal to the RGB values of the pixels of these four images before the chromatic aberration of magnification corrections (e.g. these four images right after the extraction of these four images by the display image extractor 54). For example, in the chromatic aberration of magnification corrections, the magnifications of red (R) and blue (B) are adjusted with reference to the magnification of green (G).

The distortion corrector 58 and the chromatic aberration of magnification corrector 60 allow the viewer to view the second image P2(L), the first image P1(L), the first image P1(R), and the second image P2(R) in a continuous state without a feeling of strangeness.

The color tone adjuster 62 of the image processor 50 adjusts the color tones, such as brightness and hues, of the first and second images P1(L), P1(R), P2(L), and P2(R) on the basis of the viewing angle characteristics of the displays 14 and 16.

In the case of the first embodiment, the displays 14 and 16 are constituted by liquid crystal displays. Further, as shown in FIG. 1, while the first images P1(L) and P1(R) on the first display areas 14b and 16b of the displays 14 and 16 are visually identified by the viewer at a viewing angle of approximately 90 degrees, the second images P2(L) and P2(R) on the second display areas 14c and 16c are viewed at a viewing angle that is not 90 degrees.

This may cause the first images P1(L) and P1(R) and the second images P2(L) and P2(R) to be projected onto the retinas of the eyeballs e(L) and e(R) in different color tones and thereby give the viewer a feeling of strangeness due to the difference in color tone.

To address this problem, the color tone adjuster 62 adjusts the color tones of the first and second images P1(L), P1(R), P2(L), and P2(R) so that these four images are projected onto the retinas of the viewer's eyeballs e(L) and e(R), respectively, in substantially the same color tones.

It should be noted that the color tone adjuster 62 may be omitted in a case where the displays 14 and 16 are OLED displays that look uniform in color tone at any viewing angle.

Alternatively, the first and second eye lenses 18, 20, 22, and 24 may include films, coating layers, or filters that replace the color tone adjuster 62 to adjust the color tones of the first and second images P1(L), P1(R), P2(L), and P2(R).

The display position adjuster 64 of the image processor 50 adjusts the display positions of the first and second images P1(L), P1(R), P2(L), and P2(R) on the display screens 14a and 16a of the displays 14 and 16. That is, the display positions are adjusted so that these four images look continuous to the viewer.

The output 66 of the image processor 50 outputs, to the displays 14 and 16, the first and second images P1(L), P1(R), P2(L), and P2(R) whose sizes and aberrations have been corrected and whose color tones and display positions have been adjusted.

Figure 21:
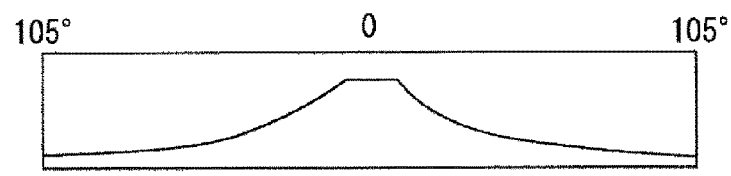
FIG. 21 is a diagram showing an image as seen by the viewer.

Such image processing performed by the image processor 50 allows the viewer to view the second image P2(L), the first image P1(L), the first image P1(R), and the second image P2(R) in a continuous state, i.e. an image that extends over the entire horizontal field of vision as shown in FIG. 21, without a feeling of strangeness.

It should be noted that the image processor 50 may be provided inside or outside of the body 12 of the head-mounted display device 10. In a case where the image processor 50 is provided outside of the body 12, the head-mounted display device 10 and the image processor 50 are connected either by cable or wirelessly. In a case where the image processor 50 is provided outside of the body 12, the head-mounted display device 10 is lighter in weight (than in a case where the image processor 50 is provided inside of the body 12) and therefore higher in usability.

The first embodiment such as the above makes it possible to provide a head-mounted display device that gives a further realistic effect with less increases in size and weight.

It should be noted that an embodiment of the present disclosure is not limited to the embodiment described above.

For example, as shown in FIG. 4, in the case of the embodiment described above, the display 14 (16) is curved in a horizontal direction (i.e. on a horizontal plane (X-Y plane)) but flat in a vertical direction (Z-axis direction). However, the present disclosure is not limited to this embodiment.

Second Embodiment

Figure 22:
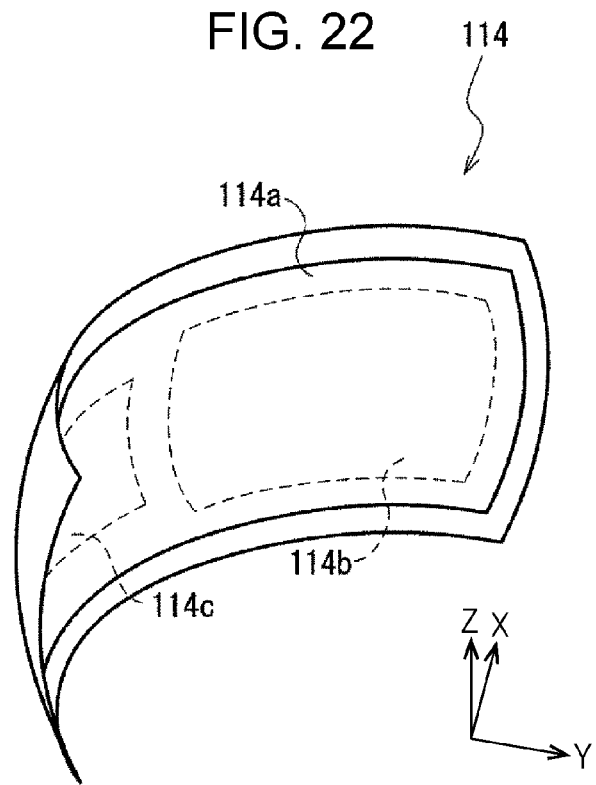
FIG. 22 is a schematic perspective view of a head-mounted display device according to a second embodiment.

FIG. 22 shows a head-mounted display device according to a second embodiment.

As shown in FIG. 22, a display 114 is a belt-shaped curved display bent in a horizontal direction (X-axis direction, Y-axis direction) and a vertical direction (Z-axis direction). As in the embodiment described above, the display 114 includes a display screen 114a, and the display screen 114a includes a first display area 114b that displays a first image that is projected onto a first eye lens and a second display area 114c that displays a second image that is projected onto a second eye lens. The display 114 is for example a flexible liquid crystal display or OLED display.

The display 114 shown in FIG. 22 can cover the display-side lens surfaces of the first and second eye lenses vertically as well as horizontally. This makes it possible to present an image to the viewer over the entire vertical field of vision of the viewer. This makes it possible to provide the viewer with a further realistic effect (than in the case of a vertically-flat display).

Further, in the case of the embodiment described above, as shown in FIG. 1, the head-mounted display device 10 includes the left-eye display 14 and the right-eye display 16. These two displays may be replaced by one display that presents both a left-eye image and a right-eye image.

Third Embodiment

Figure 23:
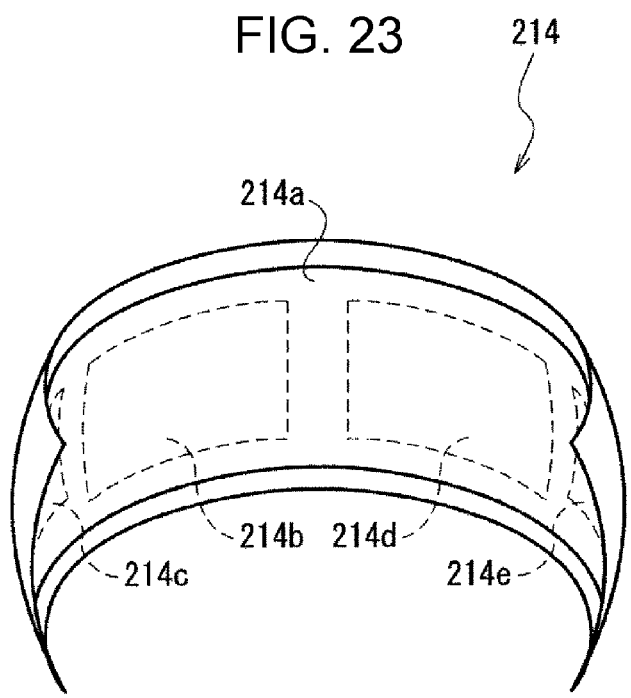
FIG. 23 is a schematic perspective view of a head-mounted display device according to a third embodiment.

FIG. 23 shows a head-mounted display device according to a third embodiment.

As shown in FIG. 23, a display 214 includes a display screen 214a. A left part of the display screen 214a includes a left-eye first display area 214b that displays a first image that is projected onto a left-eye first eye lens and a left-eye second display area 214c that displays a left-eye second image that is projected onto a left-eye second eye lens. Meanwhile, a right part of the display screen 214a includes a right-eye first display area 214d that displays a right-eye first image that is projected onto a right-eye first eye lens and a right-eye second display area 214e that displays a right-eye second image that is projected onto a right-eye second eye lens.

With one display 214 thus displaying left-eye and right-eye images, the control of the display is more simplified (for example, only one control circuit is needed for the display) than in the case of displays separately provided for the left eye and the right eye. In the case of a left-eye display and a right-eye display, there is a need to finely adjust the image quality and the like of each of the displays in view of an individual difference between the two displays. With one display 214, such a need is eliminated.

As for the display, it is alternatively possible to use flat displays.

Fourth Embodiment

Figure 24:
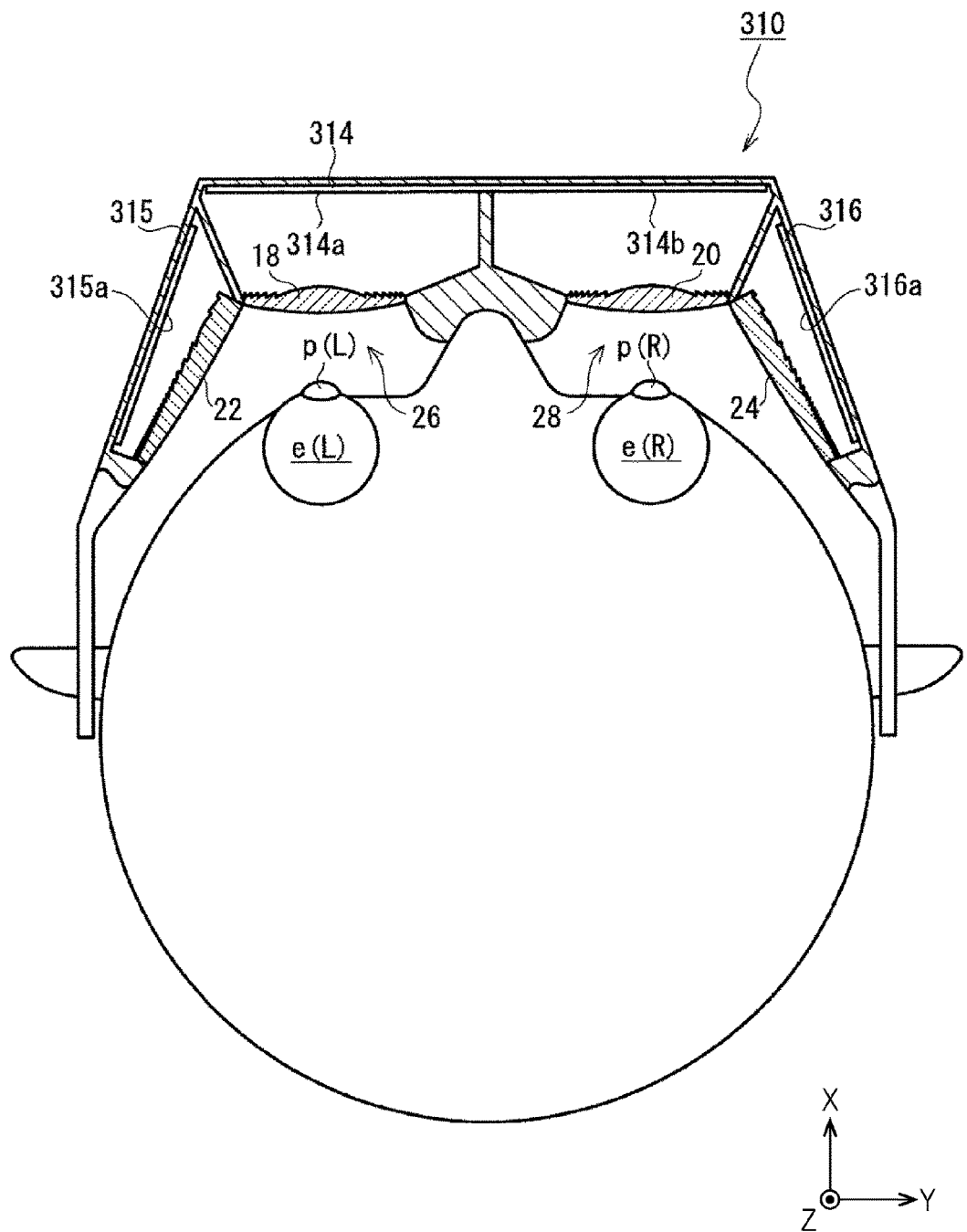
FIG. 24 is a schematic perspective view of a head-mounted display device according to a fourth embodiment.

FIG. 24 shows a head-mounted display device according to a fourth embodiment. It should be noted that the other constituent elements excluding the displays are substantially the same as those of the embodiment shown in FIG. 1 and, as such, are given the same reference numerals.

As shown in FIG. 24, a head-mounted display device 310 according to the fourth embodiment includes three flat displays 314, 315, and 316.

While facing the pupils p(L) and p(R) of the eyeballs e(L) and e(R) in a forward-viewing state, the display 314 is placed in front of the pupils p(L) and p(R). The display 314 also has a display screen including a left-eye display area 314a that displays a left-eye first image that is projected onto the left-eye first eye lens 18 and a right-eye display area 314b that displays a right-eye first image.

While facing the pupil p(L) of the left eyeball e(L) in a forward-viewing state, the display 315 is placed laterally diagonally in front of the pupil p(L). The display 315 also has a display screen including a display area 315a that displays a left-eye second image that is projected onto the left-eye second eye lens 22.

While facing the pupil p(R) of the right eyeball e(R) in a forward-viewing state, the display 316 is placed laterally diagonally in front of the pupil p(R). The display 316 also has a display screen including a display area 316a that displays a right-eye second image that is projected onto the right-eye second eye lens 24.

Since the displays 314, 315, and 316 are flat, they are easily manufactured and, therefore, the manufacturing cost is low.

As to the manufacturing cost, it is also possible to lower the manufacturing cost of the eye lenses.

For example, since, as shown in FIGS. 9A and 9B, the second eye lens 22 does not have a rotation symmetrical shape centered at the optical axis C2, the second eye lens 22 is higher in manufacturing cost than a rotational symmetrical lens. Specifically, it takes time to fabricate the Fresnel lens section 22a (i.e. to process a plurality of annular V-shaped grooves). In particular, in order to make the second eye lens 22 thinner and make the second eye lens 22 less conspicuous to the viewer, the plurality of V-shaped grooves are small in depth. This makes it necessary to process a large number of V-shaped grooves, and this processing takes time.

Figure 25:
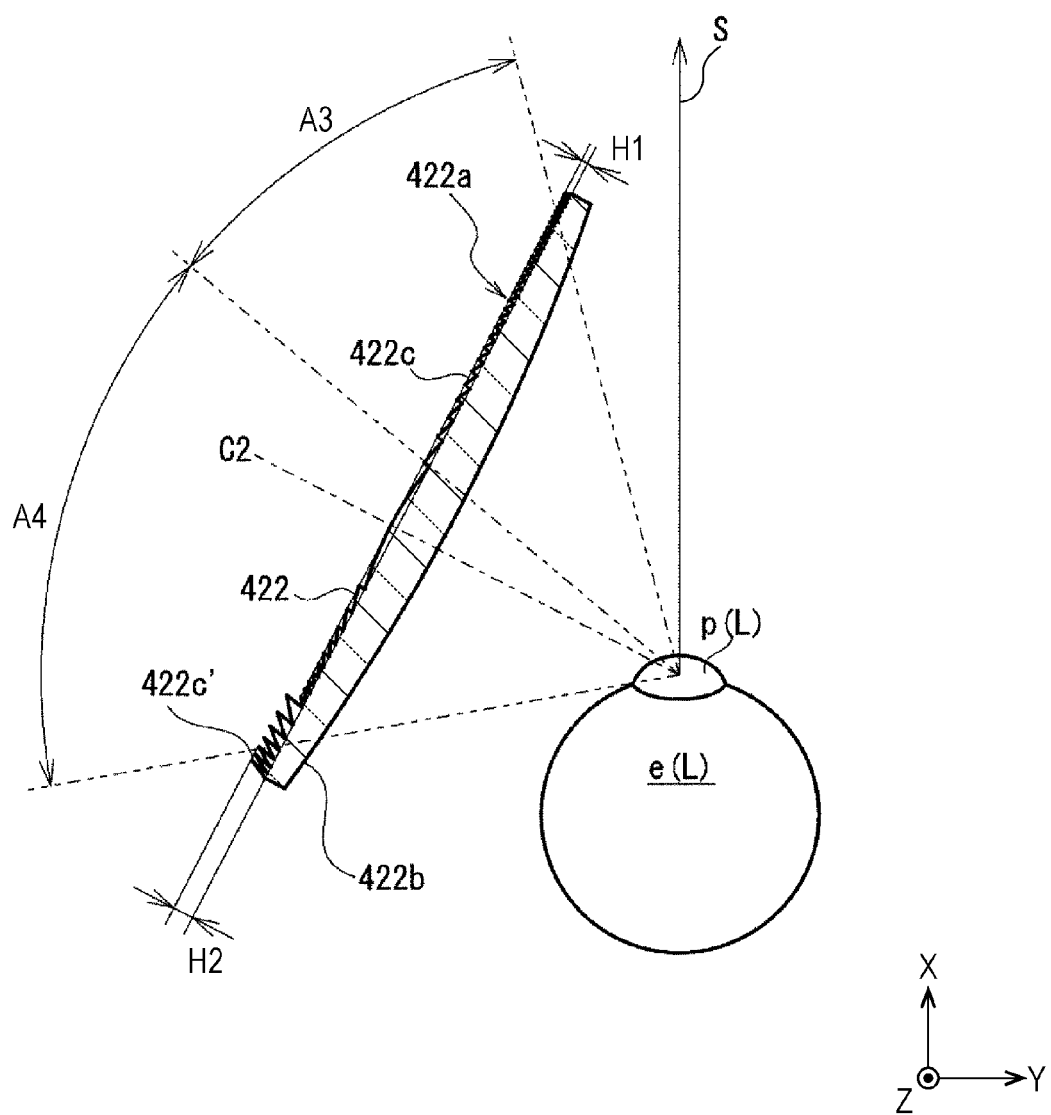
FIG. 25 is a diagram showing a second eye lens of a head-mounted display device according to a further different embodiment.

To address this problem, a second eye lens 422 shown in FIG. 25 includes a Fresnel lens section 422a whose plurality of V-shaped grooves 422c are partly different in depth. Specifically, a V-shaped groove 422c' that is farther from the first eye lens (i.e. on the boundary side of the viewer's field of vision) is greater in depth than a V-shaped 422c that is closer to the first eye lens (i.e. on the center side of the viewer's field of vision). In the case of the fourth embodiment, as shown in FIG. 25, a V-shaped 422c' located outside of the auxiliary field of vision A4 is greater in depth than V-shaped grooves 422c located within the inductive field of vision A3 and auxiliary field of vision A4 of the eyeball e(L) in a forward-viewing state.

The V-shaped groove 422c' is out of the field of vision when the viewer is looking forward as shown in FIG. 25 but comes into the field of vision (auxiliary field of vision A4) when the viewer shifts his/her line of sight laterally diagonally forward. Further, since the V-shaped 422c' is located near the boundary of the entire field of vision (approximately 100 degrees), the V-shaped 422c' is less conspicuous to the viewer even with a great depth.

Since some V-shaped grooves 422c' of the Fresnel lens section 422a are relatively greater in depth than other, the total number of V-shaped grooves that are formed in the second eye lens 422 is smaller than in a case where all of the V-shaped grooves are formed with shallow depths.

Specifically, the shallower the V-shaped grooves become in depth, i.e. the narrower the V-shaped grooves become in width, the larger the total number of V-shaped grooves that are formed in the lens becomes as a result. Therefore, the total number of V-shaped grooves that are formed in the lens can be reduced by making some of the V-shaped grooves greater in depth (i.e. greater in width) (than other V-shaped grooves). This shortens the time required to fabricate (time required to process) the Fresnel lens. This makes it possible to lower the manufacturing cost of the second eye lens.

Furthermore, in the case of the embodiment described above, as shown in FIG. 2, the second eye lens 22 is placed side by side with the first eye lens 18 in a horizontal direction. That is, the first eye lens 18 is placed on the center side of the horizontal field of vision of the eyeball e(L) in a forward-viewing state, and the second eye lens 22 is placed on the boundary side of the horizontal field of vision. However, the present disclosure is not limited to this embodiment. For example, a first eye lens may be placed on the center side of the vertical field of vision, and two second eye lenses may be placed on the upper and lower boundary sides, respectively, of the vertical field of vision.

Alternatively, for example, a first eye lens may be placed in front of a forward-viewing eyeball, and second eye lenses may be placed on the boundary side of the horizontal field of vision, the upper boundary side of the vertical field of vision, and the lower boundary side of the vertical field of vision, respectively (that is, four eye lenses may be placed for a single eye).

Furthermore, in the case of the embodiment described above, as shown in FIG. 1, the two eye lenses 18 and 22 are used for the left eye, and the two eye lenses 20 and 24 are used for the right eye. However, two or more eye lenses may be used for a single eye. For example, a third eye lens may be provided between the left-eye first and second eye lenses 18 and 22. Similarly, a third eye lens may be provided between the right-eye first and second eye lenses 20 and 24. That is, in a broad sense, the present disclosure is directed to a head-mounted display device that is worn on a viewer's head for use, including: a first display that displays a first image, the first display facing a pupil with which the viewer looks forward, the first display being placed in a position in front of the pupil; a second display that displays a second image, the second display facing the pupil with which the viewer looks forward, the second display being placed in a position diagonally in front of the pupil; a first eye lens that projects the first image onto the pupil, the first eye lens being placed in a position between the pupil and the first display; and a second eye lens that projects the second image onto the pupil, the second eye lens placed in a position between the pupil and the second display, wherein the second display is positioned with respect to the second eye lens so that at least part of the second display is located closer to the second eye lens than a position at which the second image is formed on the retina of the viewer's eyeball.

The foregoing embodiments have been described as examples of the art of the present disclosure. For that purpose, the accompanying drawings and the detailed description are provided. Accordingly, the constituent elements described in the accompanying drawings and the detailed description not only include constituent elements that are essential to solving the problems but also, to illustrate the art, include constituent elements that are not essential to solving the problems. For that reason, these non-essential constituent elements should not be regarded as essential simply because these non-essential constituent elements are described in the accompanying drawings and the detailed description.

Further, since the foregoing embodiments serve to illustrate the art of the present disclosure, various changes, substitutions, additions, omissions, and the like can be made within the scope of the claims or the scope of equivalents thereof. Supplement In FIG. 1, the head-mounted display device 10 includes the first display 14b, the second display 14c, the first eye lens 18, and the second eye lens 22.

In FIG. 1, the user's pupil p(L) is looking forward of the user. At this time, the first display 14b is placed in front of the user's pupil p(L), and the second display 14c is placed diagonally in front of the user's pupil p(L). The first eye lens 18 is placed between the first display 14b and the pupil p(L), and the second eye lens 22 is placed between the second display 14c and the pupil p(L). The first display 14b displays the first image and projects it onto the pupil p(L) through the first eye lens 18. The second display 14c displays the second image and projects it onto the pupil p(L) through the second eye lens 22.

In FIG. 1 or 12, the distance between the second display 14c and the second eye lens 22 becomes shorter with distance from the first display 14b. This causes at least part of the second image to converge toward behind the user's retina and thus defocused on the user's retina. In other words, since the defocusing of the second eye lens 22 is allowed, the distance between the second display 14c and the second eye lens 22 is enabled to effectively reduce. The phrase "converge toward behind the user's retina" here does not mean that the light actually reaches the back of the user's retina, but means that at least part of an imaginary collecting area is set at the back of the user's retina such that the second image is defocused on the user's retina.

It should be noted that in a case where the second eye lens 22 has a finely stepped lens surface as shown in FIG. 1, the distance between the second display 14c and the second eye lens 22 varies slightly according to the steps. However, the "distance between the second display and the second eye lens" in the present disclosure corresponds to a distance measured in disregard of such slight variations and, more specifically, to the distance between the second display and an envelope surface touching the ridge lines of the steps of the second eye lens.

In FIGS. 8A and 8B, the first eye lens 18 is a Fresnel lens. The first eye lens 18 has a lens surface including a convex lens surface including the center of the lens surface, a plurality of ring surfaces, arranged outward, which surround the convex lens surface, and a plurality of rising surfaces each of which connects two adjacent ring surfaces. The convex lens surface and the plurality of ring surfaces fulfill a function which is similar to that of a simple convex lens. The term "center of the lens surface" here means a point of intersection between the lens surface and the optical axis. In the example shown in FIG. 8A, the surface of the convex lens section 18c corresponds to the convex lens surface, and the surface of the Fresnel lens section 18d corresponds to the ring surfaces and the rising surfaces. In the example shown in FIG. 8A, the top (i.e. the center) of the convex lens surface is more raised than an envelope surface touching the plurality of ridge lines formed by the plurality of ring surfaces and the plurality of rising surfaces. The first eye lens 18 may be rectangular as indicated by the box CL1 in FIG. 8B. In this case, at least some of the ring surfaces partly surround the convex lens surface. In other words, the "ring surfaces" in the present disclosure do not need to be completely closed but may be interrupted at the edge of the lens.

In FIGS. 9A and 9B, the second eye lens 22 is a Fresnel lens. The second eye lens 22 has a lens surface including a convex lens surface including the center of the lens surface, a plurality of ring surfaces, arranged outward, which surround the convex lens surface, and a plurality of rising surfaces each of which connects two adjacent ring surfaces. The convex lens surface and the plurality of ring surfaces fulfill a function which is similar to that of a simple convex lens. As indicated by the box CL2 in FIG. 9B, for example, the second eye lens 22 may have a shape whose contour has one end in a linear shape and an opposite end in a circular arc shape. In this case, the outermost ring surface may curve along the circular arc shape. In the area on the right side of the dashed-dotted line C2 in FIG. 9A, a vector normal to each of the rising surfaces is tilted in a direction toward the second display 14c from a direction extending perpendicularly toward the optical axis C2. On the other hand, in the area on the left side of the dashed-dotted line C2 in FIG. 9A, a vector normal to each of the rising surfaces is tilted in a direction toward the inside of the second eye lens 22 from a direction extending perpendicularly toward the optical axis C2. Further, as shown in FIG. 9B, the centers of the plurality of ring surfaces do not coincide with the center of the convex lens surface. Therefore, with attention focused on one ring surface, the ring surface is narrower in width in the left part of the drawing than in the right part of the drawing.

In the examples shown in FIGS. 7 and 8B, the lens surface of the first eye lens 18 includes a linearly-shaped upper edge 18e and a linearly-shaped lower edge 18f when seen from an angle along the optical axis. Note, however, that the lens surface of the first eye lens 18 is not limited to this shape. For example, the upper edge 18e may have an upward convex curved shape, and the lower edge 18f may have a downward convex curved shape.

In the examples shown in FIGS. 7 and 9B, the lens surface of the second eye lens 22 includes a linearly-shaped upper edge 22d and a linearly-shaped lower edge 22e when seen from an angle along the optical axis. Note, however, that the lens surface of the second eye lens 22 is not limited to this shape. For example, the upper edge 22d may have an upward convex curved shape, and the lower edge 22e may have a downward convex curved shape.

In the example shown in FIG. 22, the first display 114b and the second display 114c are included in one curved display panel 114. Alternatively, for example, the first display 114b and the second display 114c may be separately provided in two curved display panels.

In a case where the first display 114b and the second display 114c have curved display surfaces, the first eye lens 18 and the second eye lens 22 can be made larger in size, for example, whereby the vertical viewing angle of the user can be made larger.

What is claimed is:

1. A head-mounted display device configured to be worn on a user's head, the head-mounted display comprising:
   a first display that displays a first image, the first display being located in front of a pupil of the user in a forward-looking-state in which the pupil is looking forward of the user;
   a second display that displays a second image, the second display being located diagonally in front of the pupil in the forward-looking-state;

a first eye lens that causes first light of the first image to pass through the pupil, the first eye lens being located between the pupil and the first display in the forward-looking-state; and a second eye lens that causes second light of the second image to pass through the pupil, the second eye lens being located between the pupil and the second display in the forward-looking-state, a distance between the second display and the second eye lens decreasing as a distance from the first display increases, wherein a lens surface, which faces the second display, of the second eye lens includes:
   a plurality of ring surfaces arranged from inside of the second eye lens toward outside of the second eye lens; and
   a plurality of rising surfaces each extending between adjacent two of the plurality of ring surfaces.

2. The head-mounted display device according to claim 1, wherein the second display and the second eye lens cause at least part of the second light to converge toward behind a retina of the user in the forward-looking-state.

3. The head-mounted display device according to claim 1, wherein
   the second eye lens includes:
      a first edge that is in contact with the first eye lens and has a linear shape when seen from an optical axis direction of the second eye lens; and
      a second edge that is located opposite to the first edge and has a circular arc shape when seen from the optical axis direction.

4. The head-mounted display device according to claim 1, wherein:
   each of the plurality of rising surfaces includes an inclined surface at a position closer to the first eye lens than a center of the lens surface, and
   a normal vector to the inclined surface is tilted in a direction toward the second display with reference to a vector perpendicularly directed to an optical axis of the second eye lens from the inclined surface.

5. The head-mounted display device according to claim 1, wherein the first eye lens has a horizontal angle of view of 60 degrees or larger to 120 degrees or smaller.

6. The head-mounted display device according to claim 1, wherein each of the plurality of ring surfaces becomes narrower in width as a distance from the first eye lens increases.

7. The head-mounted display device according to claim 1, wherein:
   the lens surface of the second eye lens includes:
      a first area that is closer to the first eye lens than a center of the lens surface; and
      a second area that is farther from the first eye lens than the center of the lens surface, and
   at least one of the plurality of rising surfaces in the second area is greater in width than the plurality of rising surfaces in the first area.

8. The head-mounted display device according to claim 1, wherein an edge of the second eye lens is contact with an edge of the first eye lens over a vertical area of 20 degrees or larger of the user's field of vision.

9. The head-mounted display device according to claim 1, wherein a first space through which light propagates from the first display to the first eye lens and a second space through which light propagates from the second display to the second eye lens are separated from each other.

10. The head-mounted display device according to claim 1, wherein the first display and the second display are included in one curved display panel.

11. The head-mounted display device according to claim 10, wherein the curved display panel is flexible.

12. The head-mounted display device according to claim 1, further comprising an image processor that acquires an original image and extracts the first image and the second image from the original image,
   wherein part of the first image overlaps part of the second image.

13. The head-mounted display device according to claim 12, wherein the image processor further corrects at least either the first image or the second image to make the second image smaller in size than the first image.

14. The head-mounted display device according to claim 12, wherein the extracted second image is shorter in horizontal length than the extracted first image.

15. The head-mounted display device according to claim 12, wherein the image processor further performs at least one selected from the group consisting of a first correction and a second correction, the first correction correcting the first image according to an aberration property of the first eye lens, the second correction correcting the second image according to an aberration property of the second eye lens.

16. The head-mounted display device according to claim 12, wherein the image processor further performs at least one selected from the group consisting of a first correction and a second correction, the first correction correcting a color tone of the first image according to a viewing angle characteristic of the first display, the second correction correcting a color tone of the second image according to a viewing angle characteristic of the second display.

17. The head-mounted display device according to claim 1, wherein at least one of the first eye lens and the second eye lens includes a film, a coating layer, or a film for adjusting a color tone of the first or second image according to a viewing angle characteristic of the first or second display.

18. A head-mounted display device configured to be worn on a user's head, the head-mounted display comprising:
   a first display that displays a first image, the first display being located in front of a pupil of the user in a forward-looking-state in which the pupil is looking forward of the user;
   a second display that displays a second image, the second display being located diagonally in front of the pupil in the forward-looking-state;
   a first eye lens that causes first light of the first image to pass through the pupil, the first eye lens being located between the pupil and the first display in the forward-looking-state; and
   a second eye lens that causes second light of the second image to pass through the pupil, the second eye lens being located between the pupil and the second display in the forward-looking-state, a distance between the second display and the second eye lens decreasing as a distance from the first display increases,
   wherein a lens surface, which faces the first display, of the first eye lens includes:
      a plurality of ring surfaces arranged from inside of the first eye lens toward outside of the first eye lens; and
      a plurality of rising surfaces each extending between adjacent two of the plurality of ring surfaces.

19. The head-mounted display device according to claim 18, wherein
   the lens surface of the first eye lens further includes:

a convex lens surface surrounded by the plurality of ring surfaces, a center of the convex lens surface is more protruded toward the first display than an envelope surface touching the plurality of ring surfaces.

* * * * *